United States Patent
Green et al.

(10) Patent No.: US 9,101,860 B2
(45) Date of Patent: Aug. 11, 2015

(54) FILTRATION MEDIAS, FINE FIBERS UNDER 100 NANOMETERS, AND METHODS

(71) Applicant: CLARCOR Inc., Franklin, TN (US)

(72) Inventors: Thomas B. Green, Liberty Township, OH (US); Scotty L. King, Hamilton, OH (US); Lei Li, West Chester, OH (US)

(73) Assignee: Clarcor Inc., Franklin, TN (US)

( * ) Notice: Subject to any disclaimer, the term of this patent is extended or adjusted under 35 U.S.C. 154(b) by 0 days.

(21) Appl. No.: 13/954,715

(22) Filed: Jul. 30, 2013

(65) Prior Publication Data

US 2013/0313736 A1 Nov. 28, 2013

Related U.S. Application Data

(62) Division of application No. 12/271,322, filed on Nov. 14, 2008, now abandoned.

(60) Provisional application No. 60/989,218, filed on Nov. 20, 2007.

(51) Int. Cl.
| | | |
|---|---|---|
| *B01D 39/14* | (2006.01) | |
| *B01D 39/04* | (2006.01) | |
| *B01D 39/16* | (2006.01) | |
| *B82Y 30/00* | (2011.01) | |

(52) U.S. Cl.
CPC ............ *B01D 39/04* (2013.01); *B01D 39/1623* (2013.01); *B01D 2239/025* (2013.01); *B82Y 30/00* (2013.01); *Y10S 977/762* (2013.01)

(58) Field of Classification Search
CPC .. B01D 39/04; B01D 2239/025; B82Y 30/00; Y10S 977/762

USPC ............ 264/10; 55/482–489, 522–528; 210/483–499; 442/327–417; 977/762, 977/961, 840

See application file for complete search history.

(56) References Cited

U.S. PATENT DOCUMENTS

| | | |
|---|---|---|
| 1,975,504 A | 10/1934 | Formhals |
| 3,994,258 A | 11/1976 | Simm |
| 4,144,553 A | 3/1979 | Schmidt et al. |
| 4,230,650 A | 10/1980 | Guignard |

(Continued)

FOREIGN PATENT DOCUMENTS

| | | |
|---|---|---|
| EP | 0 162 645 A1 | 11/1985 |
| EP | 1048335 A1 | 11/2000 |

(Continued)

OTHER PUBLICATIONS

Yuris Dzenis; Spinning Continuous Fibers for Nanotechnology; Material Science; Jun. 25, 2004; 3 pages (1917-1919); vol. 304.

(Continued)

*Primary Examiner* — Thomas McKenzie
(74) *Attorney, Agent, or Firm* — Reinhart Boerner Van Deuren P.C.

(57) ABSTRACT

An electrospinning fine fiber production methodology for generating a significant amount of fibers with diameters of less than 100 nanometers is provided. Also, a filter media composite comprising a substrate layer and an electrospun fine fiber layer having a increased efficiency relative to pressure drop and/or a controlled pore size distribution is provided. According to some embodiments nylon is electrospun from a solvent combination of formic and acetic acids.

10 Claims, 18 Drawing Sheets

(56) References Cited

U.S. PATENT DOCUMENTS

| | | | |
|---|---|---|---|
| 4,650,506 A | 3/1987 | Barris et al. | |
| 4,759,782 A | 7/1988 | Miller et al. | |
| 5,672,399 A | 9/1997 | Kahlbaugh et al. | |
| 5,782,944 A | 7/1998 | Justice | |
| 6,171,684 B1 | 1/2001 | Kahlbaugh et al. | |
| 6,604,925 B1 | 8/2003 | Dubson | |
| 6,641,773 B2 | 11/2003 | Kleinmeyer et al. | |
| 6,673,136 B2 | 1/2004 | Gillingham et al. | |
| 6,709,480 B2 | 3/2004 | Sundet et al. | |
| 6,743,273 B2 | 6/2004 | Chung et al. | |
| 7,029,620 B2 | 4/2006 | Gordon et al. | |
| 7,086,846 B2 | 8/2006 | Kleinmeyer et al. | |
| 7,134,857 B2 | 11/2006 | Andrady et al. | |
| 7,318,852 B2 | 1/2008 | Chung et al. | |
| 7,754,123 B2 | 7/2010 | Verdegan et al. | |
| 7,779,262 B2 * | 8/2010 | Kim et al. | 713/180 |
| 7,815,427 B2 | 10/2010 | Green et al. | |
| 7,967,588 B2 | 6/2011 | Green et al. | |
| 8,172,092 B2 | 5/2012 | Green et al. | |
| 2003/0106294 A1 | 6/2003 | Chung et al. | |
| 2004/0116028 A1 | 6/2004 | Bryner | |
| 2004/0255783 A1 | 12/2004 | Graham et al. | |
| 2005/0048274 A1 * | 3/2005 | Rabolt et al. | 428/304.4 |
| 2005/0163955 A1 | 7/2005 | Schafer et al. | |
| 2005/0193696 A1 | 9/2005 | Muller et al. | |
| 2005/0235619 A1 | 10/2005 | Heinz et al. | |
| 2006/0290031 A1 | 12/2006 | Jirsak et al. | |
| 2007/0062855 A1 | 3/2007 | Chase et al. | |
| 2007/0163217 A1 | 7/2007 | Frey et al. | |
| 2007/0294988 A1 | 12/2007 | Miller et al. | |
| 2008/0017038 A1 | 1/2008 | Wu | |

FOREIGN PATENT DOCUMENTS

| | | |
|---|---|---|
| EP | 1 059 106 A2 | 12/2000 |
| GB | 1346231 | 2/1974 |
| JP | 52136239 A | 11/1977 |
| JP | 2004508164 A | 3/2004 |
| JP | 2004508165 A | 3/2004 |
| JP | 2007092237 A | 4/2007 |
| JP | 2007154336 A | 6/2007 |
| WO | WO 02/20129 A2 | 3/2002 |
| WO | WO 02/20130 A2 | 3/2002 |
| WO | WO 03016601 A1 | 2/2003 |
| WO | WO 2005/024101 A1 | 3/2005 |
| WO | WO 2005/090653 A1 | 9/2005 |
| WO | WO 2006/049664 A1 | 5/2006 |
| WO | WO 2006049664 A1 * | 5/2006 |
| WO | WO 2006/108363 A2 | 10/2006 |
| WO | WO 2006/108363 A3 | 10/2006 |
| WO | WO 2006/108364 A1 | 10/2006 |
| WO | WO 2006/131081 A1 | 12/2006 |
| WO | WO 2006129910 A1 * | 12/2006 |
| WO | WO 2007/001405 A2 | 1/2007 |
| WO | WO 2007/054039 A1 | 5/2007 |
| WO | WO 2007/054040 A2 | 5/2007 |
| WO | WO 2007/095335 A2 | 8/2007 |
| WO | WO 2008/028428 A1 | 3/2008 |

OTHER PUBLICATIONS

A.L. Yarin et al.; Upward Needleless Electrospinning of Multiple Nanofibers; Polymer; 2004; 4 pages (2977-2980); vol. 45.

Timothy H. Grafe et al.; Nanofiber Webs from Electrospinning; Nonwovens in Filtration—Fifth International Conference, Stuttgart, Germany; Mar. 2003; 5 pages (1-5).

Nanofiber Electrospinning Unit; downloaded from internet May 30, 2007; 4 pages; website: http://www.keskato.co.jp/english/neu/index.html.

U.S. Appl. No. 60/989,218, filed Nov. 20, 2007, Green et al.

U.S. Appl. No. 61/047,455, filed Apr. 24, 2008, Li et al.

U.S. Appl. No. 61/047,459, filed Apr. 24, 2008, Green.

* cited by examiner

FILTRATION MEDIAS, FINE FIBERS UNDER 100 NANOMETERS, AND METHODS

CROSS-REFERENCE TO RELATED PATENT APPLICATIONS

This patent application is a divisional of and claims priority benefit from U.S. patent application Ser. No. 12/271,322 which claimed priority benefit from U.S. Provisional Patent Application No. 60/989,218, the entire teachings and disclosure of which are incorporated herein by reference thereto.

FIELD OF THE INVENTION

The present invention generally relates to polymeric fine fibers such as may be made from electrostatic spinning of fibers from a polymeric solution, methods involving the same and/or new filter media composite structures incorporating fine fibers.

BACKGROUND OF THE INVENTION

The production of fine fibers from polymeric solution through electrostatic spinning (a.k.a. "electro-spinning") via an electric field created by a voltage differential between a collecting electrode and a spinning electrode is known. For example, as shown in U.S. Pat. No. 6,743,273, polymeric solution is pumped to a spinning electrode in the form of a rotating emitter in which the pump solution is pumped from a reservoir and forced through holes in the emitter. Upon exiting, the electrostatic potential between a grid and the emitter imparts a charge which causes the liquid to be "spun" as thin fine fibers where they are collected on a substrate as an efficiency layer. During this process, the solvent is evaporated off the fine fibers which draws down the fiber diameter during their flight.

Another example of an electrostatic spinning device is shown in Patent Publication Nos. US2006/0290031 and WO2006/131081. The spinning electrode designs disclosed in these applications are in the form of a rotating drum-like body that may take several different forms. The drum is situated and bathed within a polymeric solution reservoir and is rotated about an axis perpendicular relative to the path of a collection media. By rotating the drum through the polymer solution, the spinning surface of the charged electrode is coated with the polymeric solution. Various drum like body variations are shown throughout these two patent publications to include providing a multiple pointed tips to create discrete spinning locations where fine fibers are generated.

Additionally, in relation more specifically to fine fibers for filter media, there is U.S. Patent Publication No. 2007/0163217, the entire disclosure of which is hereby incorporated by reference as this application shares a common inventor with the present application. The '217 publication provides filter media cellulosic/polyamide composites with solvent bonding between the fine fiber layer and the substrate layer. As disclosed therein, cellulosic/polyamide composites were produced by way of pumping and forcing polymeric solution through small nozzles for deposition on a cellulosic substrate material with sufficient residual solvent to provide solvent bonding to prevent delamination between the substrate and fine fiber layer. Such delamination or loss of part of the fine fiber layer can undesirably change filtration characteristics. According to examples therein, fine fibers made from a polyamide were made in fiber sizes of 120 nanometers, 300 nanometers and 700 nanometers according to methodology explained therein. The polyamide and cellulosic filter media composite material disclosed the '217 publication affords certain filtration characteristics as shown by a pore size distribution histogram being shown therein. The present application and invention relates to developments and advances in the state of the art.

BRIEF SUMMARY OF THE INVENTION

The present invention has several aspects that may be claimed and stand as patentable individually or in combination including but not limited to the following.

A first aspect of the present invention is directed toward a filter media comprising a substrate layer of permeable media and a fine fiber layer carried by the substrate layer in which the fine fiber layer includes a significant amount of fibers with a diameter of less then 100 nanometers. A significant amount of fibers with a diameter of less than 100 nanometers can be quantified in different alternative ways such as the percentile of fine fibers with a diameter of less than 100 nanometers, average fiber diameters and/or mean fiber diameter.

Preferably, solvent bonding is provided between the substrate layer and the fine fiber layer to prevent delamination of the fine fiber layer sufficient for use in filtration applications.

Another aspect of the present invention is directed toward an improved efficiency property due in part to a fine fiber layer. According to this aspect, a filter media includes a substrate layer of permeable media and an electrospun fine fiber layer carried by the substrate layer in which the combination of the substrate layer and the fine fiber layer apart from other layers have an efficiency of at least 90 percent for 0.75-1.00 micron sized particles. Additionally, this is achieved while at the same time having less than a 15 percent difference in pressure drop when comparing the combination of the fine fiber layer and substrate layer relative to the substrate layer alone (and even more preferably much less).

Yet another aspect of the present invention relates to a more controlled pore size distribution. In particular, a filter media with a control pore size distribution can comprise a substrate layer of permeable media and an electrospun fine fiber layer carried by the substrate layer, the combination of which and apart from other layers, if any, have at least a 50 percent pore size distribution over a separation range of 6 microns.

Another aspect of the present invention is directed toward a method of forming filter media comprising dissolving a polymer in a solvent to form a polymer solution; electro spinning fine fibers from the polymer solution from an electrode; depositing the fine fibers onto a substrate layer; and controlling spinning parameters including selecting at least one polymer and at least one solvent to generate a significant amount of fine fibers with a diameter of less than 100 nanometers.

A further aspect is utilizing a dissolving agent in combination with a surface tension and/or conductivity control agent. For example, a mixture of solvents can be utilized to cause thinner fiber formation such as a solvent combination of acetic and formic acids for a nylon example.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In this disclosure, Applicant will first provide disclosure of preferred fine fiber generation equipment for filter media production and then turn to new fine fibers, filter medias and methods that may be accomplished thereby. For purposes of organization and readability, different section and subsection titles have been provided. Attention will first be provided to embodiments of fine fiber production machinery that can create fine fibers and filter medias in accordance with embodiments of the present invention.

Fine Fiber Production Equipment

Figure 1:
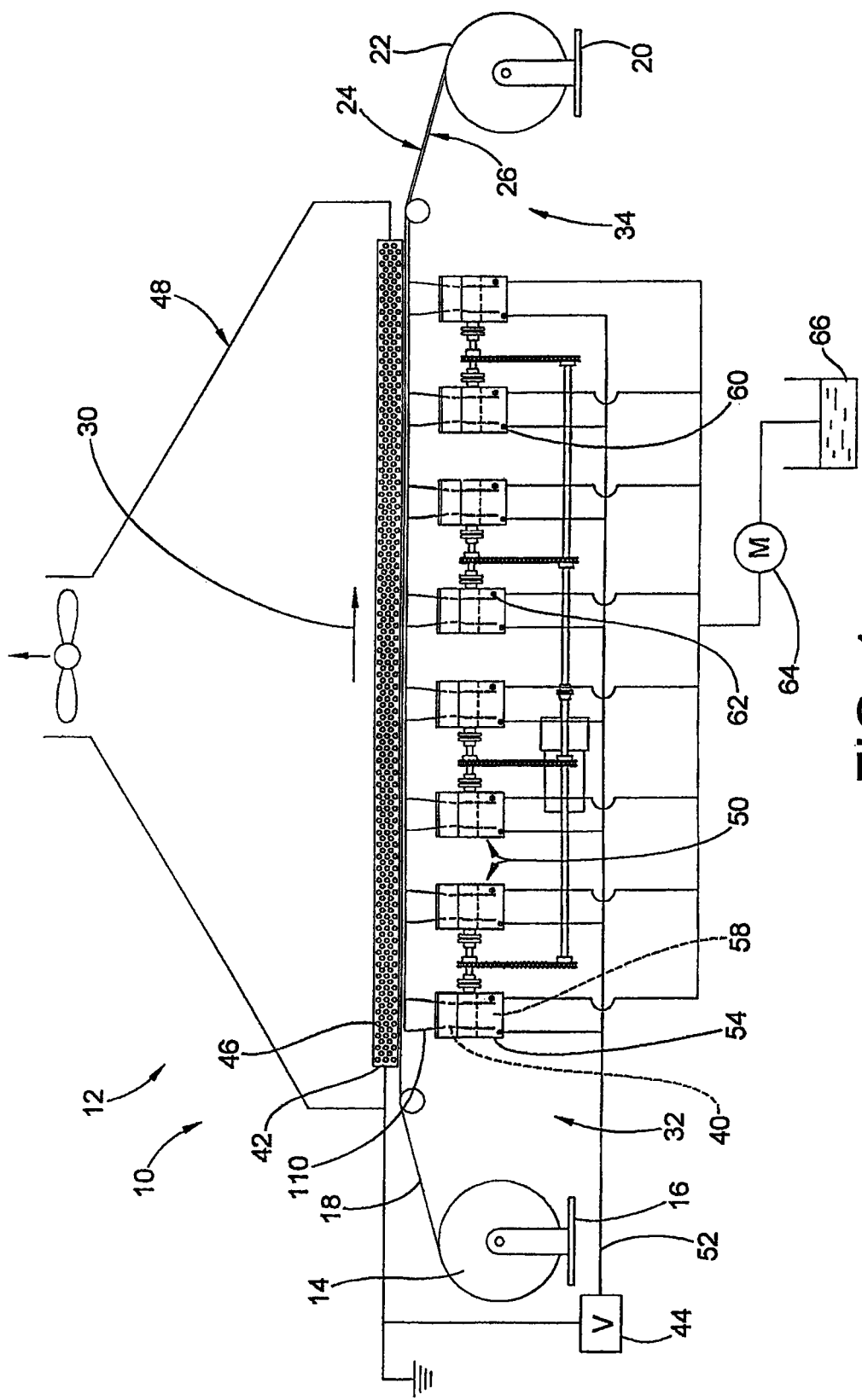
FIG. 1 is a partly schematic side elevational view of a fine fiber generation machine which may be used for production of filtration media in accordance with an embodiment of the present invention.
Figure 2:
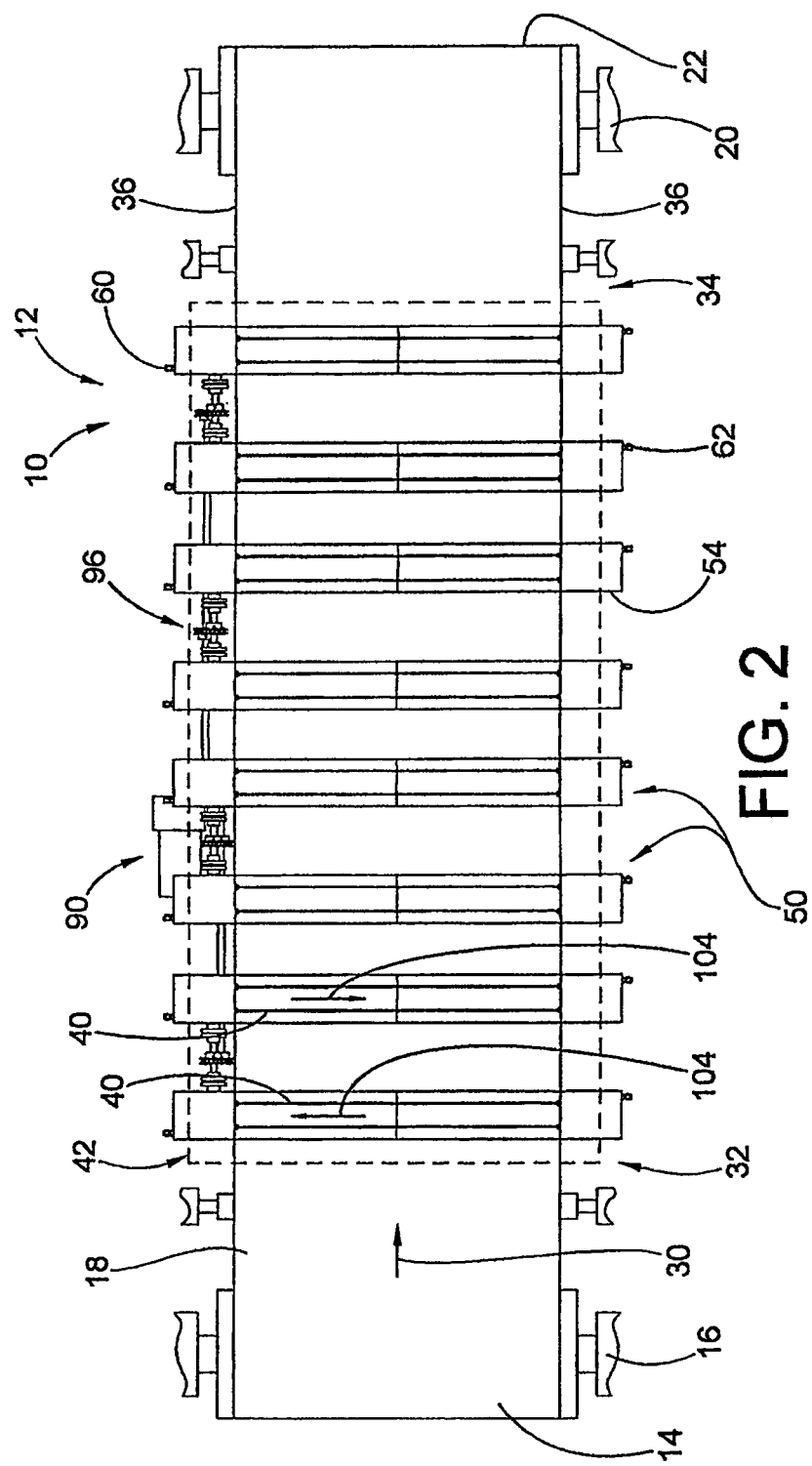
FIG. 2 is a partly schematic plan view of the machine shown in FIG. 1.

For purposes of illustration, an example of fine fiber production equipment for creating fine fibers and filter medias in accordance with embodiments of the invention is illustrated in partial schematic form as a fine fiber production machine 10 as part of a filter media production system 12 in FIGS. 1 and 2. The production system includes a replaceable master roll 14 of fine fiber collection media substrate shown in the form of a filter media substrate roll 14 that is arranged upon a unwind machine 16. The continuous substrate sheet 18 is fed from the filter media substrate roll 14 through the fine fiber production machine for collecting fine fibers and is rewound by a rewind machine 20 on a filter media roll 22 having a filter media substrate layer 24 and a high efficiency fine fiber layer 26. After the master substrate roll 14 is depleted, a new filter media substrate roll can be replaced thereon as needed.

As shown, the sheet 18 of media runs along a first direction 30 through the fine fiber production machine 10 generally from an entrance region 32 to an exit region 34. The sides 36 of the filter media sheet generally run parallel with this first direction 30 naturally.

The fine fiber production machine includes an electrostatic field that is generated between first and second electrodes to include one or more spinning electrodes 40 whereat fine fibers are generated on the one hand and a collection electrode 42 to which the fine fibers are drawn under the force provided by the electrostatic field. As shown, the media sheet 18 is typically run between the spinning electrode 40 and the collection electrode 42 such that the fine fibers are usually not deposited upon the collection electrode 42 but instead deposited on the filter media sheet 18. The collection electrode 42 is preferably a conductive perforated plate of substantial surface area for maximizing locations to where threads are collected. Many small holes 46 are formed in the perforated plate to facilitate vacuum suction of evaporated solvent through a blower driven ventilation hood system 48 that evacuates evaporated solvent to an external location such as outside a facility. As schematically shown, the collection electrode 42 spans at least the width of media and width a length of spinning electrodes 40, collectively, as does the ventilation hood system 48. The filter media substrate layer runs in contact and is supported against the collection electrode 42 under suction pressure against gravity. Preferably, this support arrangement is flat and planar as illustrated.

To generate the electrostatic field, a high voltage supply is provided and that is connected to at least one of the electrodes 40, 42 for generating a high voltage differential between the electrodes 40, 42 on the order of between 10,000 and 150,000 volts or more (and more preferably for the production of fine fibers for filter media between 75,000 and 120,000 volts), although other voltage ranges may be possible. Typically, the collection electrode 42 will simply be grounded however, the voltage generation source may provide a potential to the collection electrode other then ground such that the spinning electrode may not necessarily be at such a high voltage potential relative to ground. In either event, a voltage source is arranged to generate a voltage differential between the first and second electrodes sufficient for generating the spinning of fine fibers from polymeric solution through an electrostatic field.

Figure 3:
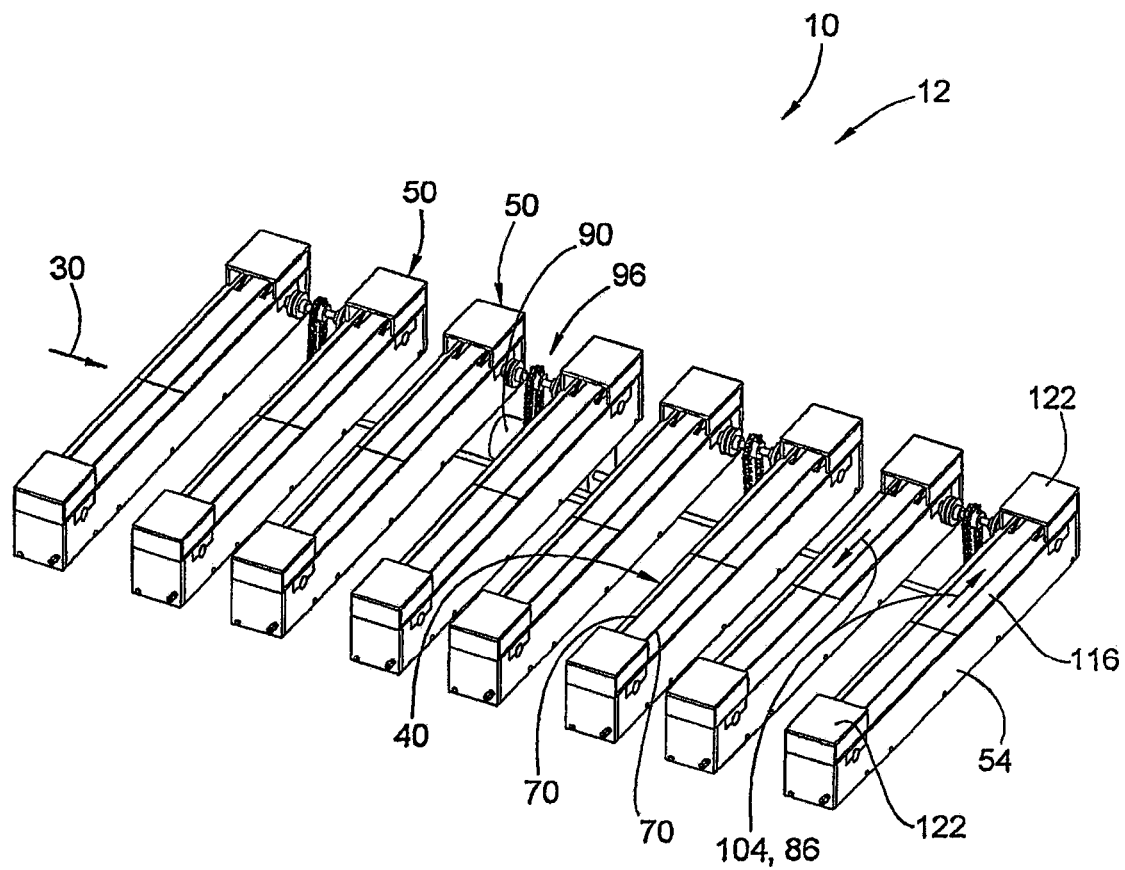
FIG. 3 shows an isometric view of a plurality of polymeric solution basins and electro-spinning electrodes and appropriate drive mechanism for driving the same in accordance with an embodiment of the present invention and which may be incorporated and used in the schematic illustration shown in FIG. 1.
Figure 4:
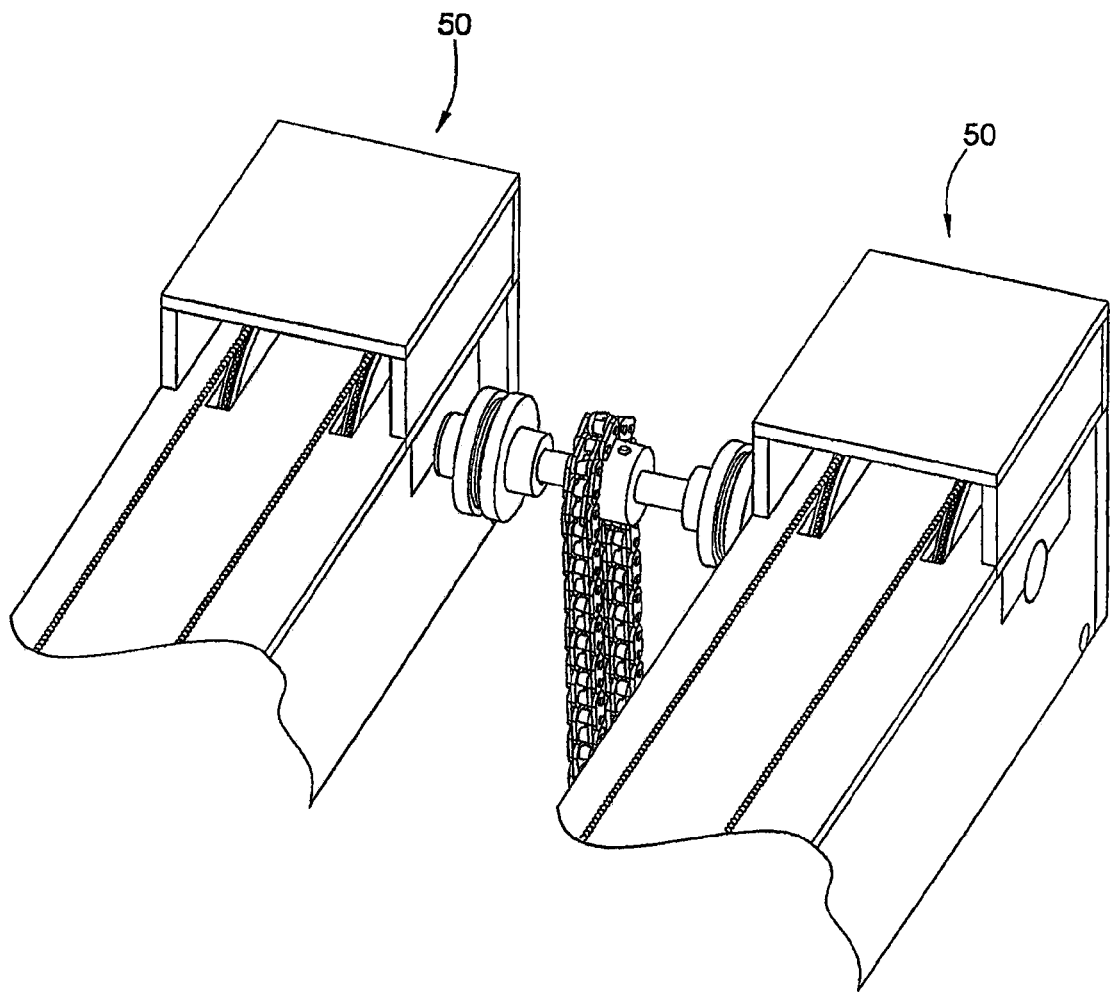
FIG. 4 is a enlarged view of a portion of the apparatus shown in FIG. 3.
Figure 5:
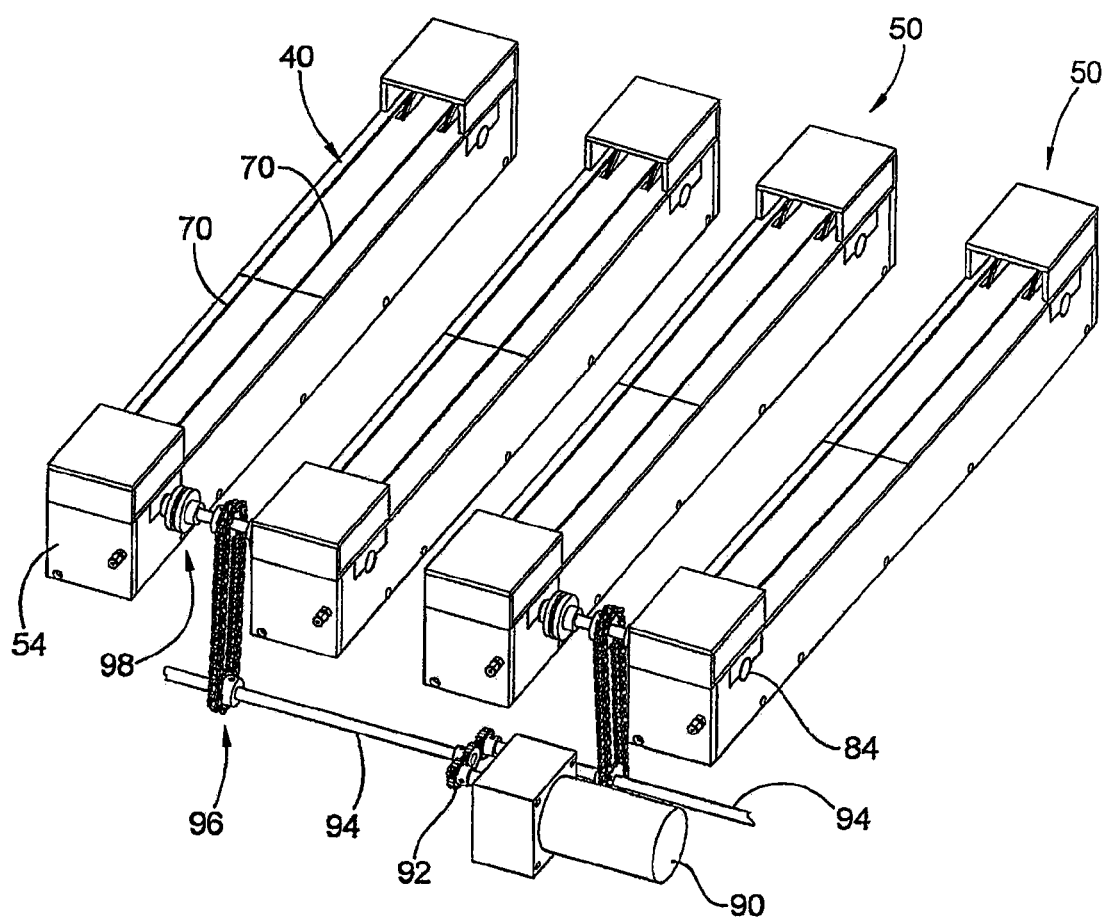
FIG. 5 is an enlarged and different isometric view of a portion of the apparatus shown in FIG. 3 to better illustrate an example of a drive unit.

In one embodiment, an apparatus includes a single spinning electrode 40. For example, the single electrode of FIG. 7 may be used to form its own machine. As shown in the other figures, multiple spinning electrodes 40 can be provided between the entrance region 32 and the exit region. One or more spinning electrodes may be assembled as a unit in an individual fine fiber production cell 50. For example, multiple fine fiber production cells 50 can be arranged between entrances and exit regions as shown in FIGS. 1-3. Each of the fine fiber production cells 50 is coupled to the high voltage supply 44 via an electrical wire 52 and each of the cells are subject to the same electrical voltage potential and differential relative to the collection electrode 42.

Figure 7:
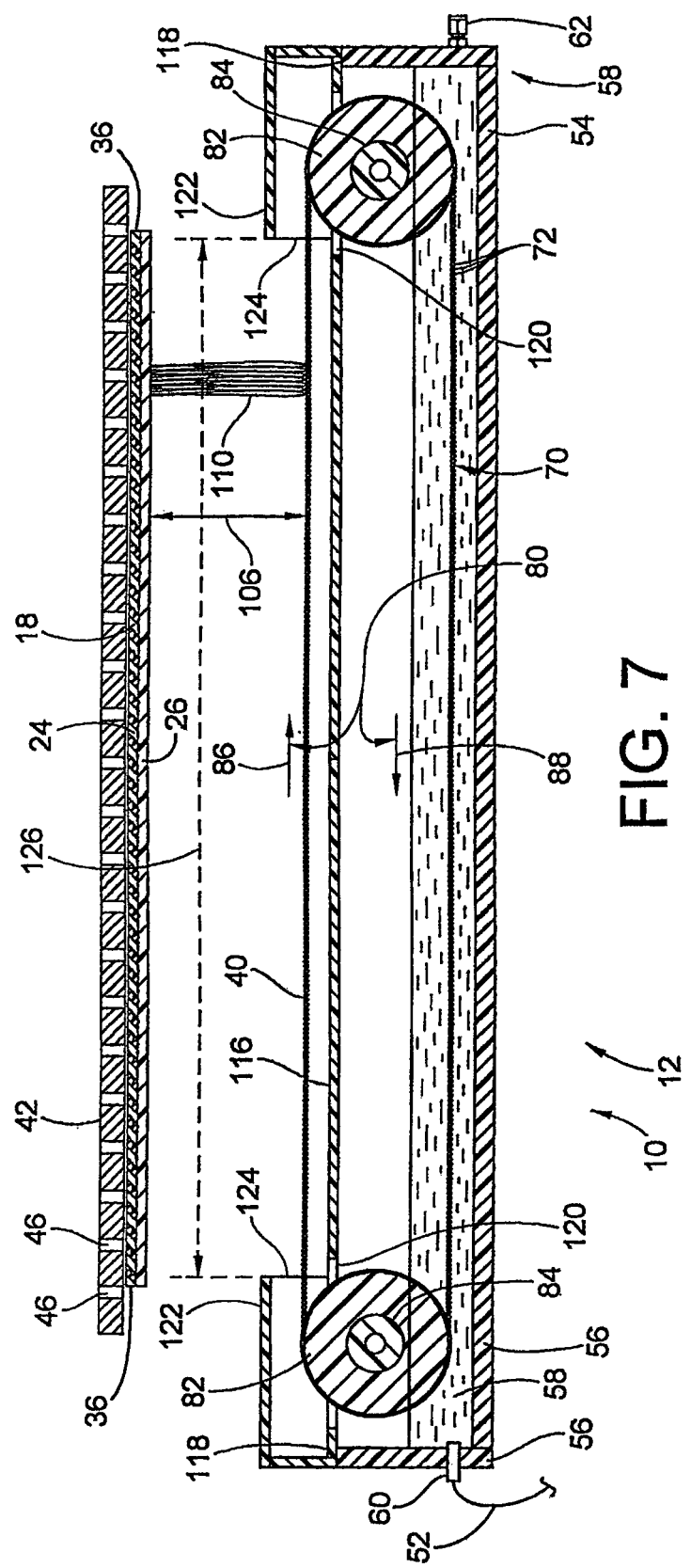
FIG. 7 is a cross sectional view of one of the electro-spinning cells or units shown in FIG. 3.

Turning in greater detail to an individual production cell 50, with reference to FIG. 7, each cell 50 includes a dipping basin 54 which may take the form of a plastic walled box like vessel structure. Each of the walls 56 of the dipping basin 54 are constructed from insulating material such as plastic (but a plastic or other insulating material that is not considered soluble for the planned solvents to be employed) so as to prevent unintentional discharge of the voltage communicated into the basin 54 from the high voltage supply 46. The dipping basin 54 contains a polymeric solution 58, comprising a suitable solvent and a suitable polymer for electro-spinning of fine fibers.

Mounted into one of the plastic walls 56 is the metal electrical terminal 60 that extends through one of the walls 56 and that is connected by an electrical wire 52 to the high voltage supply 44. The terminal 60 is in communication with the polymeric solution 58 and thereby charges the solution for communication of the voltage potential therethrough along to the spinning electrode 40.

Additionally, to provide for periodic replenishment of the polymeric solution, a fluid coupling such as quick connect coupling 62 that conventionally includes a one-way check valve is mounted into and through one of the walls 56 to allow for periodic replenishment of the polymeric solution through the addition of more such solution. This may be hooked up to a fluid replenishment system that periodically replenishes the basin with more polymeric solution to include a fluid metering unit 64 and a reservoir 66. Control valves or individual metering units (one dedicated to each cell) may be provided to individually control the solution in each cell.

As shown, the spinning electrode 40 may take the form of a strand and as shown in the embodiment, an endless strand in the form of an endless chain 70. The endless chain 70 is preferably made of metal or other conductive material such that it is readily conductive and is in electrical circuit with the high voltage supply 44 by virtue of electrical communication provided by and through the polymeric solution 58. The endless chain 70 preferably includes a plurality of individual discrete segments 72 as shown best in FIG. 8. Each of the discrete segment is connected and spaced from another adjacent segment by a gap 74 and spacer segment 76. In this embodiment, the segments 72 are beads that form a bead chain in which the individual beads that take the form of generally spherical balls 78. For example, a stainless steel metal beaded chain can provide for the spinning electrode.

The endless chain 70 is mounted along an endless path 80 around two guides which may take the form of movable guide wheels 82 that are spaced at opposite ends of the dipping basin 54. The guide wheels 82 may be sheave like structures as shown and can be metal, plastic or other suitable material. The guide wheels 82 are mounted for rotation on insulating axels 84 such as plastic material axels so as to insulate the voltage potential within the dipping basin 54. The axels 84 are rotatable relative to the walls 56 of the dipping basin 54. The endless chain 70 is entrained about the guide wheels 82 to include a linear spinning path 86 that is exposed outside of the polymeric solution 58. The spinning path 86 faces and is closest to the collection electrode 42. The endless chain 70 also has a linear return path 88 which runs through the dipping basin 54 and the polymeric solution 58 for the purpose of periodically regenerating the segments of the endless chain, that is by dipping the chain and running it through the polymeric solution. At any one time a portion of the chain is being regenerated with solution and a portion is exposed for electro-spinning.

Figure 6:
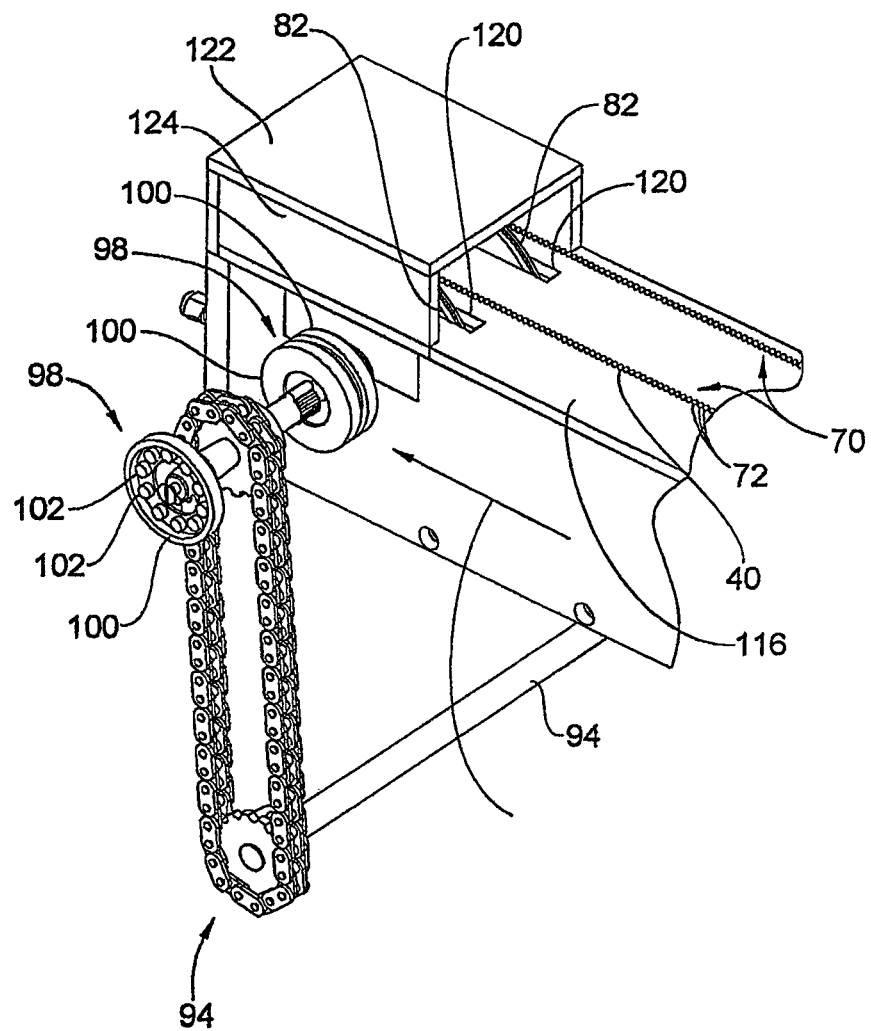
FIG. 6 is an enlarged side view of one of the individual units of the apparatus shown in FIG. 3.

To drive the endless chain 70 along the endless path 80 about the guide wheels 82, a suitable drive unit is provided, which includes a rotary motor 90 having a rotary output upon an output shaft 92. The output is then transferred through gearing to a transmission shaft 94 that transmits through the chain and sprocket mechanism 96 to electrical isolation drives 98. These drives 98 include separated but closely arranged housings 100 (See FIG. 6) containing permanent magnets 102 that are configured in an offset arrangement (magnets interposed between each other) as shown such that when operated rotation of one of the housings 100 causes the other housing 100 to rotate due to the interspersed relation of the permanent magnets 102 among the two housings and the repulsion or attraction generated thereby. One of the drive housings 100 is mounted to at least one of the guide wheels 86 for each dipping basin cell so that the guide wheel also doubles as a drive wheel to drive the endless chain 70 about the endless path 80. Of course, other appropriate drive units may be provided to drive the endless chain 70 about the endless path 80.

As can be seen from FIGS. 1, 2 and 7, the linear spinning path 86 portion of the endless chain 70 extends transversely relative to the first direction for movement along a second direction 104 that is preferably transverse (that is either perpendicular or otherwise lying crosswise such as diagonally or obliquely) relative to the first direction 30. As a result, as the sheet of media is moving along in the first direction 30 from the entrance region 32 to the exit region 34 the individual segments 72 of the endless chain 70 are moving along in the second direction 104 across the substrate sheet between opposed sides 36.

Additionally, as shown best in FIG. 7, there can be a constant spacing distance 106 of the segments 72 from the collection electrode 42 and/or the media sheet 18 as the individual segments 72 move across the entire linear spinning path 86 from one end to the other. Such a constant target distance may include minor variations due to sag in the endless chain which do not materially affect the fine fiber production. As a result, the spinning target spacing distance 106 can be tightly controlled and is not subject to wide variations as may be the case in rotating drum applications. To the extent there is sag in the endless chain along the linear spinning path 86 that is undesirable, intermediate guide supports (not shown) can be provided along the path that which may also periodically regenerate polymeric coating upon the endless chain. Such additional intermediate support apparatus may be provided in the event that electro-spinning across much longer spans are desired. Intermediate regeneration could be accomplished by pumping polymeric solution from a needle onto the chain and/or through a transfer wheel that picks up solution and transfers it onto the endless chain. In any event, to the extent there is any minor sag in the endless chain along the spinning path, it still is literally considered to include a constant spacing distance 106 within the meaning and context of the present invention and claims appended hereto, and the movement along the spinning path 86 will still literally be considered to be linear within the context of the present invention and claims appended hereto.

As evident from the foregoing, the linear spinning path 86 and movement direction of the endless chain 70 is transverse relative to the movement direction 30 of the collection media sheet 18. Preferably and as shown this transverse arrangement is preferably perpendicular although it is appreciated that other transverse arrangements including angles other than 90° may be used. Thus, in the context herein, transverse includes but does not mean perpendicular but is broader in the sense and is meant to also include a strand for electro-spinning generation that moves generally crosswise in a direction generally between the opposed sides 36 of the collection media sheet 18.

According to an operational mode embodiment, during operation the filter media collection sheet 18 runs along the first direction continuously as well as the endless chain 70 moving about the endless path 80 continuously. However, it will be appreciated that intermittent operation of either can be accomplished if desired for various purposes.

Figure 8:
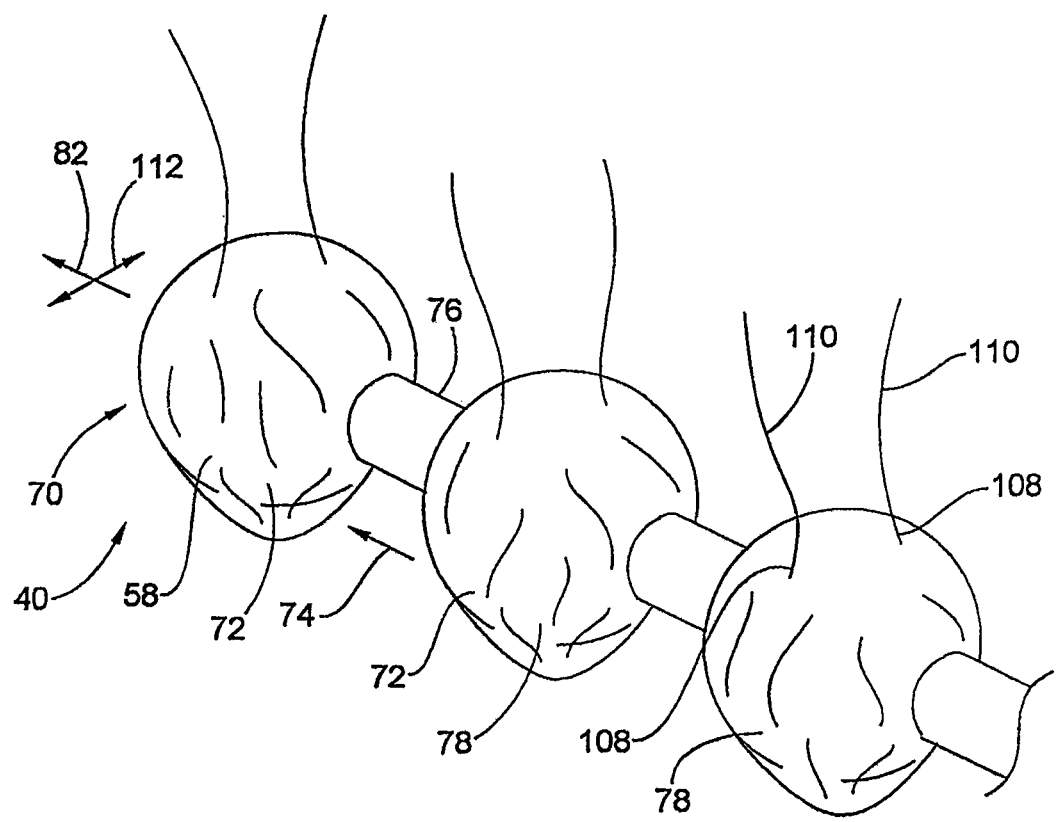
FIG. 8 is a close up demonstrative illustration of a portion of the endless chain electrode used in the aforementioned figures for use in explaining how at least two spinning locations are typically formed from a polymeric solution coating on each of the individual chain segments during operation.

During operation and as shown in FIGS. 7 and 8, the endless chain 70 along the linear spinning path 86 includes multiple spinning locations 108 which are linearly aligned in an array of at least one row and as shown two rows. The spinning locations are spaced by the gaps 74 which in the case of the present embodiment are equally spaced gaps 74 such that the spinning locations 108 are equally spaced along the linear spinning path 86. The reason is that configuration of the spherical balls 78 generates typically two spinning locations 108 for the formation of fine fibers 110. As shown, the spinning locations 108 are on opposite sides of the spherical ball 78 and spaced apart along a lateral axis 112 that is perpendicular relative to the linear spinning path 86 by virtue of electrical repulsion (e.g. the charged spinning threads tend to repel each other). Thus the curved nature of the individual segments 72 is beneficial in producing the desired spacing between spinning locations and providing multiple spinning locations per each individual segment thereby producing more fine fiber and controlling the production of fine fiber for uniformity purposes. However, it would be appreciated other configurations could be made such as providing a sharp edge for the production of a spinning location or a non-segmented strand.

In the case of water soluble polymers in which water is used as the solvent, the apparatus may be used in an uncovered state. However, the disclosed embodiment has a significant optional and preferred feature that provides for significant advantages over traditional dipping systems by providing a central cover 116 that is arranged to substantially cover the otherwise open end 118 of the dipping basin. With this arrangement, it can be seen that the endless chain electrode is driven around the cover to include a first portion which is contained within the dipping basin and substantially encapsulated therein by the cover and a second portion that is exposed and capable of generating fine fibers. The cover 116 can be interposed between different parts of the spring electrode as shown and can substantially enclose dipping of the electrode. The cover 116 extends substantially between the spaced apart guide wheels 82 and in the present embodiment may include guide wheel slots 120 receiving the guide wheels therethrough and providing an opening through which the endless chain 70 can pass. In the case of the present embodiment, including two endless chains 70 per cell 50 with only two guide wheels 82 provided for each endless chain 70, a total of four slots 120 may be provided. Additional slots may be provided for additional guide wheels where other support apparatus as may be desired or needed. The cover 116 is particularly advantageous when the polymer solution involves a volatile solvent and/or a solvent other then water. For example, certain solvent materials can evaporate more quickly than water and therefore make it more difficult to maintain a desirable polymer to solution ratio. The cover 116 minimizes the amount of solvent that is exposed externally at any one moment and thereby minimizes solvent loss. This is also perhaps more advantageous from a materials savings and environmental standpoint.

For example, a comparison of a covered endless beaded chain embodiment according to the disclosure of FIGS. 1-8 with a commercially available machine that has an uncovered configuration, namely, an El-Marco NANOSPIDER model NS-8A 1450 machine, available from El-Marco, s.r.o., Liberec, Czech-Republic has shown considerable solvent savings over a 16 hour testing period. In particular, for spinning polymer fine fibers from a 12% polymer solution (polymer to solution ratio), such as nylon 6 using a ⅓ formic acid and ⅔ acetic acid solvent, replenishment of the local polymer solution in the uncovered dipping basin of the El-Marco machine has required replenishment of the dipping basin with a much diluted polymer solution (and hence more solvent) to maintain the 12% solution in the dipping basin due to evaporated solvent loss. Specifically, the El-Marco machine required a solvent rich replenishment solution of a 2% solution. Whereas, an embodiment has been able to achieve maintenance of a 12% polymer solution with a more polymer rich solution of a 7% replenishment solution due to less solvent evaporation. In making this comparison, it is acknowledged that not all of the parameters of the machines are equal (e.g. among other things: the electrodes are differently configured and driven differently, the collection media flow rate may be different, the dipping basin tub size can be smaller in an embodiment of the invention considering it can be thinner in the movement direction of the collection media as it need not accommodate rotation of a drum-like electrode).

Nevertheless, considering evaporation relates in large part to available surface area (and such things as surface agitation and air flow—e.g. around the entry and exit regions of the dipping portion of the electrode), solvent savings is primarily due to the basin and electrode covering technique disclosed herein. For example, the embodiments of FIGS. 1-8 substantially cover the surface of polymer solution and also the electrode dipping entry and exit locations (areas of agitation). As such, other parameters are not seen to impact evaporation loss in a significant manner. In comparing machines, it has been calculated that the solvent evaporation savings may be up to 60% or more. Much of this advantage is considered due to the covering of the electrode during dipping and substantially enclosing the polymer solution. As such, preferably enough covering is provided to reduce solvent loss by at least 25% and more preferably by at least 50%.

In practicing one embodiment, the cover 116 can be fastened securely to the walls of the dipping basin 54 by virtue of screws or otherwise. The configuration and attachment of the cover may depend upon electrode configuration. Other arrangements or other types of electrode spinning systems are possible. Preferably, the cover reduces evaporation from solvent of the polymer solution by at least 25% as compared to an uncovered electrode spinning apparatus and even more preferably by at least 50%. For example, savings of approximately two-thirds of solvent is demonstrated by the above example.

Additionally, the illustrated embodiment includes end covers 122 at opposed ends of the cell 50 that are mounted to wall extensions 124 that extend above the cover 116 such that the end covers 122 are positioned over the opposed ends of the endless chain 70 and are disposed over the guide wheels 82. The end covers 122 also serve to reduce solvent evaporation but also serve as shrouds to limit the span of fine fiber production. As shown, the end cover span 126 between the inner edges of opposed end covers is about the same and preferably just slightly larger then the width of the corresponding media sheet 18 defined between opposed sides 36. The end cover 122 may be adjustable and/or interchangeable with other longer end covers such that the span 126 may be adjustable to accommodate different widths of collection media sheets 18 that may be run through the fine fiber production machine 10.

Figure 9:
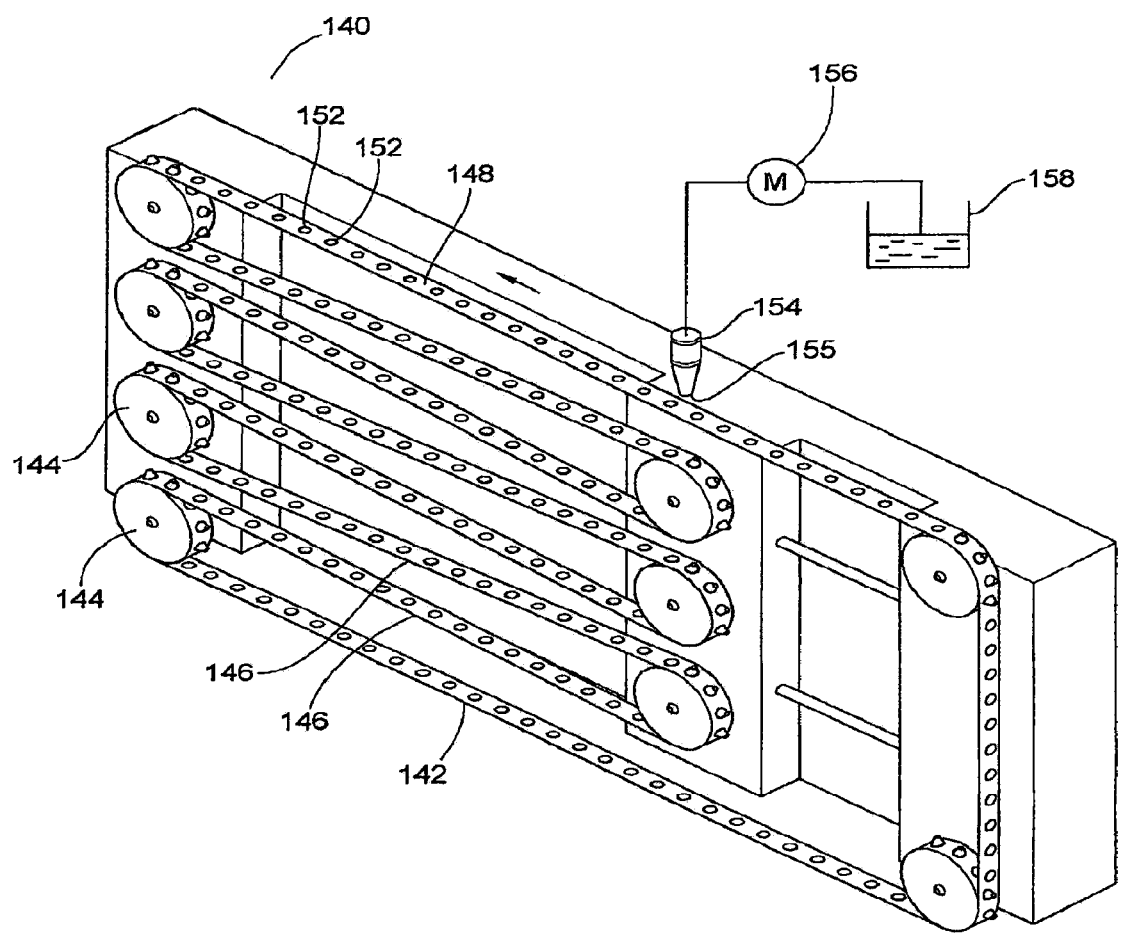
FIG. 9 is perspective illustration of a serpentine belt electro-spinning apparatus according to an alternative embodiment of the present invention.

Turning to FIG. 9, an alternative embodiment of the present invention is illustrated as a fine fiber production machine 140 that is similar in many respects to the first embodiment. For example, this embodiment similarly employs a strand that is wetted with polymeric solution and that can maintain a constant spacing of spinning locations relative to the collection media. Further, this embodiment also includes an endless strand that is driven about an endless path to provide a spinning electrode. As such, details will be directed toward some of the more salient differences.

In this embodiment, the fine fiber production machine includes an endless serpentine belt 142 that is driven in an endless path around multiple guide wheels 144. The serpentine belt 142 is preferably made of a conductive material and may take the form of a continuous endless metal band as shown to provide for a spinning electrode. The serpentine belt 142 includes several linear segments 146 between adjacent guide wheels 144 that each provide for multiple spinning locations. Generally, the edge 148 that would be disposed closest to the collection electrode provides for the spinning locations. This edge 148 can be serrated to provide multiple discrete and equally spaced sharp edges (not shown) and/or can be configured with pockets and the like to provide for local polymeric solution fluid reservoirs along the edge 148. Preferably, the guide wheels include teeth or other positioning structure which engage holes 152 and other similar positioning structure on the belt 142 such that the edge can be maintained at a constant spacing and thereby maintain a constant spacing distance 106 if such a constant spacing is desired.

The serpentine belt 142 is subject to a voltage source to generate the electrostatic field thereby serve as a spinning electrode. To provide for polymeric solution along the belt 142, this embodiment includes a wetting supply system that includes one or more needles 154 having control orifices 155 spaced adjacent to the edge 148 of the serpentine belt 142. Additionally, the needles are connected along fluid lines to a pressurized polymeric solution source afforded by a pump 156 that delivers polymeric solution from a reservoir 158. Thus, the strand generation need not necessarily be dipped but can be alternatively wetted in other means in accordance with this embodiment. Additionally, this embodiment also affords the ability for dipping the electrode in a dipping basin. For example, portions of the serpentine belt can be arranged to run vertically as opposed to horizontally due to the flexible nature of a serpentine belt. Alternatively, the right hand portion may be dipped in a dipping vessel containing polymeric solution with the collection media arranged to run vertical as opposed to horizontally.

Figure 10:
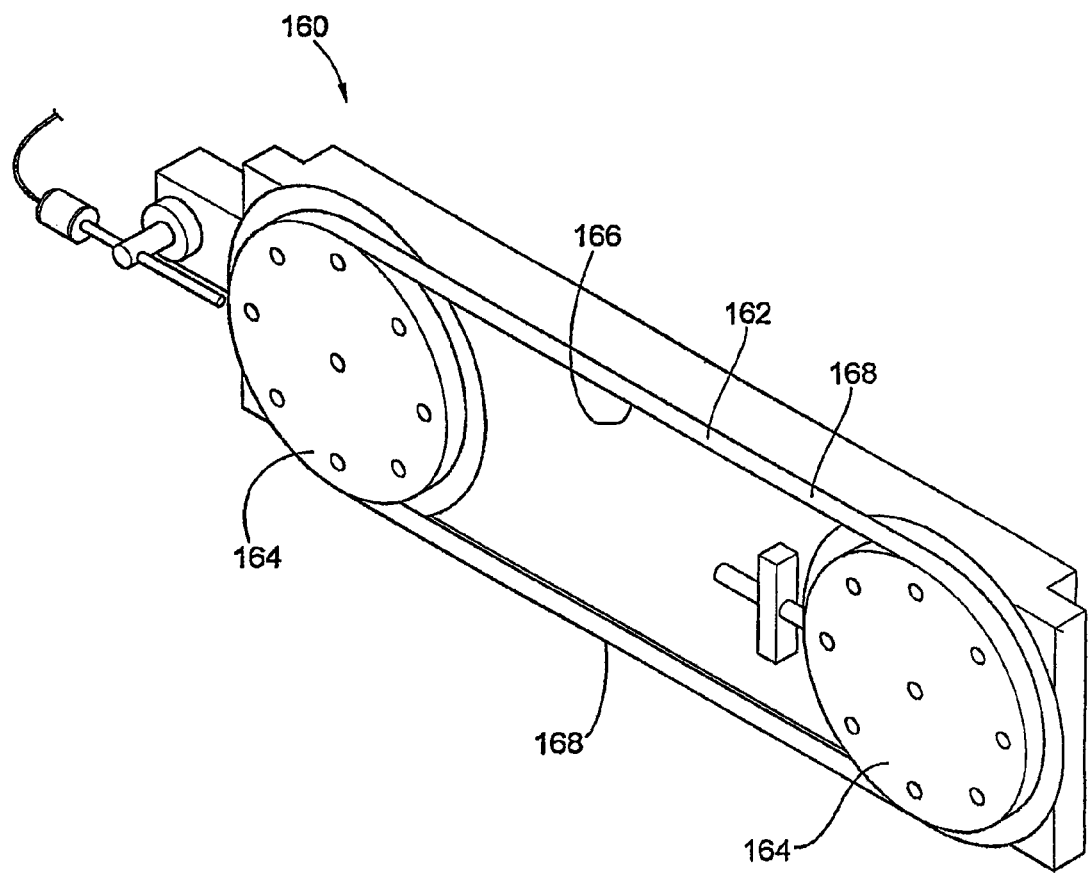
FIG. 10 is yet another alternative embodiment of the present invention involving two guide wheel pulleys driving an endless belt with a single needle dispensing location for wetting the belt with polymer solution during operation.

Yet a third embodiment of the present invention is shown in FIG. 10 as a fine fiber production machine 160 much like the prior embodiment of FIG. 9. As such, discussion will be limited. This embodiment similarly can employ a polymeric supply system comprising a needle control orifice, pump and polymeric solution reservoir. This embodiment also employs an endless strand which in this embodiment takes the form of a more simplistic metal band 162 driven around two pulleys 164. Fiber generation can be obtained from the edge 166 that is intended be disposed closest to the collection media (not shown). This embodiment is also much like the first embodiment except that both linear segments 168 of the band 162 are arranged for fiber production and may not be dipped in polymer solution. It should be noted that it is not necessarily each of the segments 168 be maintained in a constant distance. For example, it may be beneficial to generate different fibers of different characteristics to have different fiber generation spinning electrode strands arranged at different distances relative to the collection media. In this embodiment, pulleys 164 may take the form of sheaves other positioning structure to maintain positioning of the edge 166 relative to the collection media.

Now that explanation of preferred equipment has been provided, attention will now be directed toward new filter medias, fine fibers and methods, that can be produced by the equipment disclosed above or otherwise.

Filter Medias Generally

Fluid streams such as liquid flows and gaseous flows (e.g. air flows) often carry particulates that are often undesirable contaminants entrained in the fluid stream. Filters are commonly employed to remove some or all of the particulates from the fluid stream. For example, air filtration systems are used to filter gaseous streams for a wide variety of applications. Examples of such systems include: combustion engine air intake systems; vehicle cab air intake systems; HVAC (heating, ventilation and air-conditioning) systems; clean room ventilation systems; various industrial applications using filter bags, barrier fabrics, woven materials; power generation systems; gas turbines systems; and combustion furnace systems to name a few of the more common air filtration applications. Similarly, liquid filtration also involves a wide variety of applications to include filtration of: water, fuel, coolant, oil, and hydraulic fluid to name a few of the more common liquids that are filtered.

There are typically two types of filter media: surface loading media (a.k.a. barrier filtration); and depth media. Surface loading media generally traps particles on the surface of the media in a thin layer in what is sometimes referred to as a filter cake. Often the filter cake layer forms as a thin skin over the filter media, which can be peeled away usually with relatively light mechanical force. In some applications such as reverse pulse applications, the filter cake is automatically blasted off the filter media surface via a reverse pulse blast of air (or other application of mechanical force) and collected in a waste receptacle. Often times, the filter is simply replaced after sufficient filter cake buildup. Depth media on the other hand works through the thickness of the media to trap particles internally within the "depth" of the media. Depth media is loaded with particulates throughout the volume or depth occupied by the media.

Filter paper is a widely used form of surface loading media. In general, filter paper comprises dense mats of cellulose fibers, synthetic fibers, and/or other fibers oriented generally transverse relative a fluid stream. The filter paper is generally constructed to (1) be permeable to the fluid flow; (2) have a sufficiently fine pore size to inhibit the passage of particles greater than a certain size; and (3) have appropriate porosity to allow for passage of the fluid sufficient to feed the fluid requirements of the filter system or application. As fluids pass through the filter paper, the upstream side of the filter paper operates through diffusion and interception to capture and retain selected sized particles from the fluid stream.

One common parameter characteristic of filter media is the "efficiency" of the filter media. Efficiency is the propensity of the media to trap particulates as opposed to allowing the particulates to not be filtered and instead pass through the media. Another common characteristic is pressure drop across the media, which often has traditionally related to the porosity of the media. The pressure drop relates to how restrictive the filter media is to fluid flow. Larger pore sizes typically have allowed for greater fluid flow, but also unfortunately typically result in more particulates being passed. As a result, often efficiency is at odds with pressure drop. In particular, while it is often desirable to trap a large amount of particulates, providing such a high efficiency often has had the undesirable effect of increasing the restrictiveness of the media and therefore the pressure drop across the media.

Efficiency often means or refers to the initial efficiency, that is the efficiency of the filter media post manufacture but prior to usage and being loaded with particulates. During use, filter media traps and thereby picks up and traps particulates as a dust cake and/or otherwise within the media. These filtered-out particulates plug the larger holes in the media thereby preventing holes for smaller particles to pass and thereby increases the efficiency of the media over time to an operating efficiency greater than the initial efficiency. However, by plugging fluid flow paths, such filtered out particulates also eliminate or partially clog a fluid passageway and thereby increase the pressure drop across the media making it more restrictive to fluid flow.

Usually, filter lifespan is determined by the pressure drop across the filter. As more and more particles are filtered out of the fluid flow and trapped by the filter media, the filter media becomes more restrictive to fluid flow. As a result, the pressure drop across the filter media becomes higher. Eventually, the media becomes too restrictive, resulting in insufficient amount of fluid flow for fluid needs of the given application. Filter change intervals are calculated to coincide approximately with such an event (e.g. prior to reaching an insufficient fluid flow situation). Filter change intervals may also be determined through sensors that measure pressure drop load across the media.

One useful parameter for filter media that is often used in the filter industry is the reported MERV (Minimum Efficiency Reporting Value) characteristic according to ASHRAE Standard 52.2. This includes a measure of efficiency relative to pressure drop resistance. A higher MERV number generally identifies a higher grade of filter media, which typically is more expensive. For example, the following table sets forth the MERV reporting value requirements.

TABLE 1

Minimum Efficiency Reporting Value (MERV) Parameters

| Standard 52.2 Minimum Efficiency Reporting Value (MERV) | Composite Average Particle Size Efficiency, % in Size Range, μm | | | Average Arrestance, %, by Standard 52.1 Method | Minimum Final Resistance | |
|---|---|---|---|---|---|---|
| | Range 1 0.30-1.0 | Range 2 1.0-3.0 | Range 3 3.0-10.0 | | Pa | in. of water |
| 1 | n/a | n/a | $E_3 < 20$ | $A_{avg} < 65$ | 75 | 0.3 |
| 2 | n/a | n/a | $E_3 < 20$ | $65 \leq A_{avg} < 70$ | 75 | 0.3 |
| 3 | n/a | n/a | $E_3 < 20$ | $70 \leq A_{avg} < 75$ | 75 | 0.3 |
| 4 | n/a | n/a | $E_3 < 20$ | $75 \leq A_{avg}$ | 75 | 0.3 |
| 5 | n/a | n/a | $20 \leq E_3 < 35$ | n/a | 150 | 0.6 |
| 6 | n/a | n/a | $35 \leq E_3 < 50$ | n/a | 150 | 0.6 |
| 7 | n/a | n/a | $50 \leq E_3 < 70$ | n/a | 150 | 0.6 |
| 8 | n/a | n/a | $70 \leq E_3$ | n/a | 150 | 0.6 |
| 9 | n/a | $E_2 < 50$ | $85 \leq E_3$ | n/a | 250 | 1.0 |
| 10 | n/a | $50 \leq E_2 < 65$ | $85 \leq E_3$ | n/a | 250 | 1.0 |
| 11 | n/a | $65 \leq E_2 < 80$ | $85 \leq E_3$ | n/a | 250 | 1.0 |
| 12 | n/a | $80 \leq E_2$ | $90 \leq E_3$ | n/a | 250 | 1.0 |
| 13 | $E_1 < 75$ | $90 \leq E_2$ | $90 \leq E_3$ | n/a | 350 | 1.4 |
| 14 | $75 \leq E_1 < 85$ | $90 \leq E_2$ | $90 \leq E_3$ | n/a | 350 | 1.4 |
| 15 | $85 \leq E_1 < 95$ | $90 \leq E_2$ | $90 \leq E_3$ | n/a | 350 | 1.4 |
| 16 | $95 \leq E_1$ | $95 \leq E_2$ | $95 \leq E_3$ | n/a | 350 | 1.4 |

One problem with dustcake formation, in the case of surface loading filtration, is that dustcake can rapidly build up and quickly limit the lifespan of the filter. As a result, the filter paper is often pleated, fluted or otherwise constructed in a similar bunched up manner to increase the amount of media and surface area media for a given volume. Accordingly, the fine fiber coated medias according to surface loading embodiments of the present invention are typically pleated, fluted or otherwise bunched up in suitable filter element construction manner to increase filtration capacity.

While bunching of surface media such as in pleated form increases filter lifetime, such surface loading filter constructions have limitations. For this reason (and considering burst strength issues), surface loaded media has primarily found use in applications wherein relatively low velocities through the filter media are involved, often not higher than about 30 feet per minute and typically about 20 or 10 feet per minute or less. For example there are low flow applications around 1 foot per minute. The term "velocity" as used herein refers to the average velocity through the media (i.e. flow volume per media area).

In many filter media applications, and particularly high flow rate applications, depth media is chosen. A typical depth media comprises a relatively thick tangled collection of fibrous material. A typical conventional depth media filter is a deep (measured from inlet to outlet end) and substantially constant density media. Specifically, the density of the depth media remains substantially constant throughout its thickness but for minor fluctuations in density as may be caused for example by compression and/or stretching around peripheral regions due to mounting of the media and the like. Gradient density depth media arrangements are also known in which the density of the media varies according to a designed gradient. Different regions of different media density, porosity, efficiency and/or other characteristics can be provided over the depth and volume of the depth media.

Depth media is often characterized in terms of its porosity, density and solids content percentage. For example, a 5% solidity media means that about 5% of the overall volume comprises solids (e.g. fibrous materials) and the remainder is void space that is filled by air or other fluid. Another commonly used depth media characteristic is fiber diameter. Generally smaller diameter fibers for a given % solidity will cause the filter media to become more efficient with the ability to trap smaller particles. More smaller fibers can be packed together without increasing the overall solidity % given the fact that smaller fibers take up less volume than larger fibers.

Because depth media loads with particulates substantially throughout the volume or depth, depth media arrangements can be loaded with a higher weight and volume of particulates as compared with surface loaded systems over the lifespan of the filter. Usually, however, depth media arrangements suffer from efficiency drawbacks. To facilitate such high loading capacity, a low solidity of media is often chosen for use. This results in large pore sizes that have the potential to allow some particulates to pass more readily. Gradient density systems and/or adding a surface loading media layer can provide for improved efficiency characteristics. For example, a surface loading media layer can be arranged in combination such as upon the downstream end of a depth media (or between upstream and downstream faces) to increase efficiency. This surface loading media layer is sometimes referred to as a polish layer.

Since at least the 1980's, polymeric fine fiber layers have been attempted to be employed into filter media arrangements with prior art attempts provided for depth media and surface loading media. Such fine fibers have been disclosed as being produced through electrostatic fiber production (commonly known as "electrospinning"). For example, fine fiber filter media arrangements are disclosed in U.S. Pat. Nos. 4,650,506 to Barris et al.; 5,672,399 to Kahlbaugh et al.; and 6,743,273 to Chung et al. The entire disclosures of these patent references are hereby incorporated by reference in their entireties as the invention may be incorporated into one or more the filter media arrangements disclosed therein and/or other such suitable filter media arrangements. Additionally, improvements disclosed herein are applicable to the filtration applications disclosed in these prior patents and further the fine fiber materials including polymers, solvents, other agents, additives, resins and the like disclosed therein (including any alleged improved fine fiber materials) may be used in certain embodiments of the present invention are intended to be covered hereby.

As recited by some of these above records, fine fibers can be made from different polymeric materials and solvents. Examples include polyvinyl chloride (PVC), polyolefin, polyacetal, polyester, cellulose ether and ester, polyalkylene sulfide, polyarylene oxide, polysulfone, modified polysulfone polymers and polyethylene, polypropylene, polyvinyl alcohol, various nylons (polyamides such as nylon 6, nylon 6,6 and other nylons), PVDC, polystyrene, polyacrylonitrile, PMMA, PVDF. There are also a wide variety of solvents available that can be employed. The solvent chosen and used depends upon the desired polymer(s) as the solvent should be suitable for sufficiently dissolving the polymer. For example, water is not usable as a solvent for many polymers including common nylon (e.g. such as nylon 6 or nylon 6,6). In such instances, another solvent such as formic acid may be chosen for polymers such as common nylon. Solvents for making a polymeric solution for electrospinning may include acetic acid, formic acid, m-cresol, tri-fluoro ethanol, hexafluoro isopropanol chlorinated solvents, alcohols, water, ethanol, isopropanol, acetone and N-methylpyrrolidone, and methanol. The solvent and the polymer can be matched for appropriate use based on sufficient solubility of the polymer in a given solvent.

Substrate Medias

An important characteristic of an embodiment is that the fine fibers need to be formed into a filter media for use as a filter element. The fine fiber materials are formed on and adhered to a substrate that is preferably a filter media substrate have at least some filtration capabilities, although a substrate such as a scrim or other non-filtration layer is possible. Many filter media substrates comprise at least in part or in full natural cellulose fibers. There are many possibilities to include natural fiber and synthetic fiber substrates, to include spun bonded fabrics, non-woven fabrics of synthetic fiber, and non-wovens made from the blends of cellulose materials, synthetics and glass fibers, non-woven and woven glass fabrics, plastic screen like materials both extruded and hole punched, and various polymeric membranes. All of these materials typically come in sheet form that can be readily purchased in roll form. Substrate sheets with a fine fiber layer can be formed into a filter structure that is placed in a fluid stream including an air stream or liquid stream for the purpose of removing suspended or entrained particulates from that stream.

For example, porous filter media materials of the types listed above are generally commercially available in various thicknesses (usually in a range of between 0.006 to 0.020 inches of thickness) from suppliers including among others Ahlstrom Engine Filtration, LLC, of Madisonville, Ky. and Hollingsworth & Voss Company, East Walpole, Mass. Fine fibers according to embodiments of the invention can be applied to such porous filter media in which the filter media serves as substrate material for the fine fiber efficiency layer. For example, products marketed by Ahlstrom, such as Ahlstrom product numbers 19N-1 or 23N-3, AFI 23N-4 or AFI 23FW-4 other filter materials having physical characteristics similar to those tabulated in below, can be used (these are typical for engine air filtrations):

Ahlstrom 19N-1 Filter Media
100% cellulose fibers
Basis weight=70 pounds per 3000 square feet
Flat sheet caliper=14.5 mils
Grooved sheet caliper=18 mils
Frazier (CFM) 11-19, preferably 14
SD Gurley Stiffness (mg)=3000
Ahlstrom 23N-3 Filter Media
100% cellulose fibers
Basis weight=55 pounds per 3000 square feet
Flat sheet caliper=13 mils Non-grooved sheet
Frazier (CFM) 11-19
SD Gurley Stiffness (mg)=1300
Ahlstrom AFI 23N-4
Basis Weight 52-64 pounds/3000 SQ.FT.
Bubble Point First Bubble: 6.0 (min.) IWG
Mullen Cured: 30 (min) PSI
Frazier: 19-27 CFM
Caliper: 0.010-0.017 Inches
SD Gurley Stiffness: 1000 (min) MG
Ahlstrom AFI 23FW-4
Basis Weight 70-80 pounds/3000 SQ.FT.
Bubble Point First Bubble: 6 (min.) IWG
Mullen Cured: 20 (min) PSI
Frazier: 16-24 CFM
Caliper: 0.010-0.017 Inches
SD Gurley Stiffness: 1000 (min) MG Some products such as the Ahlstrom 19N-1 product is available with small grooves embossed into the media for improving dirt holding capability. Theses grooves run the length of the sheet and roll of the filter media. Such mechanical grooving and other configurations provided in the filter media structure can be used in connection with fine fiber layer production systems. As such, grooved sheets of media substrate examples while literally considered "flat" for the purposes herein need not be perfectly flat and such sheets can include grooves, corrugations, pleats and the like formed therein prior to application fine fibers.

A filter media according to one embodiment the present invention includes a first substrate layer, typically a permeable coarse fibrous media that may either be a depth or surface loading media. The substrate layer may include a sizeable filtration capacity and efficiency or may have little or no filtration capacity or efficiency relative to the designed filtration application. The substrate layer provides a surface upon which a layer of fine fiber media can be supported and secured. Preferably the substrate layer by itself (that is without the fine fiber layer) has an average diameter of at least 10 microns, typically and preferably about 2 to about 50 microns. Also preferably the substrate layer by itself has a basis weight of no greater than about 180 grams/meter$^2$, preferably about 5 to about 140 g/meter$^2$. As for other typical characteristics, preferably the first layer of permeable coarse fibrous substrate media is at least 0.0004 inch thick, and typically and preferably is about 0.005 to about 0.05 inch thick; preferably has a pore size distribution generally between about 2 and about 50 micron; and preferably has a Mullen burst strength of between about 5 and about 70 psi.

In preferred filter media arrangements, the substrate layer, typically of permeable coarse fibrous material, comprises a material which, if evaluated separately from a remainder of the construction by the Frazier permeability test at 0.5 inch water gauge, would exhibit a permeability of at least 0.5 cfm (per square foot of media), and typically between about 5 and 2000 cfm (per square foot of media).

Fine Fibers & Fine Fiber Layers & Generation

While the equipment described herein can be used to generate fibers of different sizes, preferably the layer of fine fiber material secured to the first surface of the layer of permeable coarse fibrous media is a layer of nanofibers as exemplified by examples herein wherein the fibers have a significant amount of fibers with diameters preferably less than 100 nanometers. A "significant amount" of fine fibers with diameters of less than 100 nanometers within this context means at least one of the following: (1) an average fiber diameter of less than 100 nanometers; (2) a mean fiber diameter of less than 100 nanometers; and/or (3) at least 25% of the fibers in the fine fiber layer have a diameter of less than 100 nanometers. More preferably at least 50% of the fibers in the fine fiber layer have a diameter of less than 100 nanometers, and yet even more preferably at least 70% of the fibers in the fine fiber layer have a diameter of less than 100 nanometers according to one embodiment disclosed herein. According to a one embodiment, at least 70% of the fibers have a diameter of between 50 and 100 nanometers and typically between 70% and 90% or more.

It will be appreciated that it is plausible to use and generate other fiber diameters larger than 100 nanometers in combination with a significant amount of fine fibers less than 100 nanometers.

It is also useful to consider the fine fiber filtration media characteristics that can be achieved through finer fibers and/or through uniformity improvements in equipment. Coverage and fiber generation uniformity advantages achievable with the embodiment of new fine fiber generation equipment disclosed herein which can be used to generate other larger fiber sizes. As a result, fine fibers rather than being characterized necessarily by size can be characterized in addition or instead by filter media layer characteristics as will be evident from the examples provided herein. New and improved fine fiber filtration layer properties have been achieved that are superior to a known fine fiber filtration product. Accordingly, claims are made as to characteristics of a composite filter media.

One enhanced characteristic is improved efficiency according to an embodiment of the present invention. For example, a relatively standard low efficiency and hence lower cost substrate media may be used while achieving high efficiency through the fine fiber layer. For example, and while other more efficient substrates could be used, a substrate media may comprise a surface loading filter media with an efficiency of less than 75% (e.g. around 70%) for 0.75-1.00 micron sized particles (a relatively moderate particle size); and/or an efficiency of less than 40% (e.g. around 30%) for 0.237-0.316 micron sized particles (a relatively fine particle size). Thus the substrate is not very efficient for relatively fine particles. According to an embodiment of the present invention, the combination of the substrate layer and the fine fiber layer apart from other layers, if any, may have an efficiency of at least 90% for 0.75-1.00 micron sized particles; an efficiency of at least 80% (and more preferably more than 85%) for 0.237-0.316 micron sized particles. This can be accomplished without substantial sacrifice of pressure drop.

Another enhanced property according to an embodiment of the present invention may be pore size distribution and more particularly more tightly controlling the distribution of the pore size as opposed to a random or less controlled distribution as per a prior art example. According to an embodiment of the present invention, the combination of the substrate layer and the fine fiber layer apart from other layers, if any, have at least 50% (and more preferably at least 60%) of pore size distribution over a separation range of 6 micron; at least 40% (and more preferably at least 25%) of pore size distribution over a separation range of 4 micron; and/or at least 25% of pore size distribution over a separation range of 2 micron. One example that illustrates this characteristic is example 4 (see also pore size histogram—FIG. 15).

Coverage levels of the fine fiber layer has some importance. For example, too much coverage will create a film like layer that can substantially restrict flow and undesirably increase the pressure drop. A way to test is by comparing pressure drops of uncoated and coated media to prevent unnecessarily sacrificing too much efficiency. Preferably, the pressure drop difference between the fine fiber and substrate combination relative to the substrate alone is typically less than 15%, more preferably less than 10%, even more preferably less than 5% and according to certain examples a pressure drop may be less than 1%. Another way to determine levels of coverage is base weight. Preferably the fine fiber layer by itself has a basis weight preferably of about 0.01 to about 1.0 g/meter$^2$, and more preferably between about 0.01 and about 0.10 g/meter$^2$.

The finer fibers of the present invention have significant benefits as it relates to what is considered "slip flow" according to the Knudsen number/formula (measure of rarefaction of the flow). Specifically, the impediment that a fiber places on a fluid stream is directly related to the surface area occupied by that fiber. This is important in relation to controlling pressure drop and minimizing filtration restriction in a fluid stream. More surface area typically results in a higher pressure drop across the layer, which in the case of filtration is undesirable as that restricts a fluid flow which is intended. For larger sized filter media fibers, air velocity can be substantially zero at the center of the fiber surface. For much smaller filter media fibers, "slip flow" can occur in which air velocity is significantly greater than zero at the fiber surface. As a result, even more fluid is allowed to flow past even smaller fibers due to the slippage flow effect. Further, even more fine fibers can occupy an area with smaller fiber diameter decreasing the pore size of the media but while at the same time not occupying the same overall surface area and thereby not causing significant increases in pressure drop. By utilizing finer fibers including a significant amount of fine fibers less than 100 nanometers according to certain embodiments, substantial advantages in new filtration properties are achievable, without substantially sacrificing pressure drop or unduly increasing the restriction across the filter media.

There are several parameters that are believed to have contributed to the unique fine fibers and fine fiber filtration layer according to embodiments of the present invention. It will be appreciated that certain operating parameters may be less critical while other parameters more critical. Many of the factors are interrelated with synergistic effects therebetween. As such certain parameters can be changed without departing from the present invention as recited in the claims appended hereto. Herein methodology is explained as to how to approach and adjust parameters so as to obtain a desired fine fiber production and/or filtration media characteristic.

(a) Equipment Electrode Configuration & Arrangement (Controlled Distribution of Fine Fibers)

A significant factor is production equipment for generating sufficient fine fibers for filtration media, while also generating sufficiently small fine fibers. Various desirable equipment characteristics are described herein as well as various equipment embodying such characteristics to greater or lesser degrees. While prior fine fiber filtration patents have emphasized pressurized pump emitter systems (e.g. U.S. Pat. No. 6,743,273 to Chung et al.) whereby pressurized polymeric solvent is sprayed/forced through a small emitter hole, easier, better and/or more controlled fine fiber generation are possible according to some embodiments of the present invention. While fibers can be made with forced systems in which polymer solution is forced through a small orifice, fine fibers generation according to a preferred embodiment of the present invention employs an electrode that is periodically wetted and more preferably dipped in a polymer solution to periodically regenerate a thin polymeric solution coating on the electrode. A most preferred electrospinning electrode dipping arrangement is shown in FIGS. 1-8 and is according to the description of this fine fiber generation equipment herein.

Other dipping equipment that have been found particularly beneficial for commercial production for filtration media according to embodiments herein include a El-Marco NANOSPIDER model NS-8A 1450 machine, available from El-Marco, s.r.o., Liberec, Czech-Republic. Embodiments of the invention can involve such other equipment. Examples of other potentially useable fine fiber generation electrode dipping equipment that may be available from El-Marco, s.r.o. are also disclosed in patent publications WO 2006/131081 and US 2006/0290031, the entire disclosures of which are hereby incorporated by reference.

There may be a fine fiber control benefit to fine fiber production results from periodic dipping of the electrode. Specifically, as solvent evaporates on the electrode (evaporation of solvent is desirable to draw fiber diameter down as explained herein), polymer is left behind. Such polymer build up can potentially clog production machinery and can potentially otherwise change fine fiber production by making fine fiber production less uniform (thus uneven porosity or efficiency), changing the diameter or fiber characteristic generated and in other potentially undesirable ways (e.g. using larger nozzle orifices may theoretically translate into larger fiber sizes). By dipping the electrode into the solution build up of polymer on the electrode is prevented. As a polymer is about to precipitate or form on the electrode, the dipping of the electrode puts this polymer rich film back into solution so it can readily dissolve or reconstitute prior to forming a hardened or precipitate polymer film buildup. Elimination or substantial reduction in periodic cleaning cycles of electrodes to remove unwanted polymer build up can also be achieved. Additionally, dipping the electrode avoids the potential for pressure differentials in forced polymer solution systems, which difficulties could be subject to further difficulties associated with polymer build-up on or around small orifice nozzles.

Additionally, preferably the substrate sheet is run vertically above the periodically wetted and dipped electrode. As a result, the thin polymeric coating and film tends to be thinner under the force of gravity proximate the top region of the electrode where electrostatic discharge occurs causing the formation of spinning locations of fine fiber threads (also known or referred to as "Taylor cones" or "spinnerettes"). Maintaining a thinner polymeric film region where fine fibers are initially formed might decrease the eventual, overall fine fiber size given that the thread is drawn from a smaller pool and against gravity, but under the opposite force of blower suction through holes in the collector electrode.

There may be several benefits with the new bead spinning generation of the fine fiber generation machinery embodiments relative to other embodiments, primarily relating to the amount or volume of fine fibers that are generated. For example, the new bead spinning generation equipment of the embodiment shown in FIGS. 1-8 can control and maintain substantial uniformity over the location of spinning locations across the entire sheet width of filter media according to a preferred methodology. By spacing the spinning locations according a predetermined array, as opposed to randomly, a predetermined spacing of the fine fiber spinning locations can be achieved. This is believed to result in better control over efficiency, pore sizes and pore size distribution. If regions of filter media substrate are subject to less fine fiber covering than other sections, it is typically suspected that such regions will be subject to different filtration characteristics. For example, the embodiment of FIGS. 1-8 contemplates maintaining a predetermined and equally spaced array of spinning locations. As the beaded chain type electrodes in this embodiment is driven transverse relative to the media, chains driven in opposite directions counteract potential polymeric solution gradient loss over time as individual segments and spinning locations move across the filter media substrate.

Further, by maintaining an electrode strand at a constant distance relative to the collection electrode and media, the target spinning distance and voltage potential does not change as is the case in rotated drum type electrodes (e.g. see rotating drum electrodes in aforementioned patents assigned to El Marco). Maintaining target distance as opposed to a variable distance facilitates greater control over the fine fiber whipping time and therefore the solvent evaporation time and fine fiber draw down time is maintained more constant.

Accordingly, selecting and/or developing appropriate fine fiber generation equipment can be advantageous in fine fiber layer characteristics.

(b) Electrostatic Spinning Potential & Electrode/Media Spacing

Another factor in relation to generating a substantial amount of fine fibers is the potential of the electrostatic field. For example, a commercially available NANOSPIDER model NS-8A 1450 machine, available from El-Marco, s.r.o., Liberec, Czech-Republic, has a standard electrostatic field potential provided by a 60,000 volt power supply. In relation to the commercially available El-Marco NANOSPIDER model NS-8A 1450 machine, modifications of this equipment were accomplished by providing additional voltage generation power supply, so that an electrostatic field greater than 60,000 volts can be achieved and thereby increase the fine fiber production output. It has been found that voltage potential does not greatly affect fiber size, but does have a significant effect upon the amount of fibers generated.

For example, for nylon fiber generation from a formic and acetic acid solvent based solution to a cellulose filter media substrate, preferably at least 75,000 or 80,000 volts are provided for electrospinning and even more preferably at least 95,000 volts. According to some embodiments of the present invention, an electric field potential may be set between 75,000-130,000 volts, or potentially even higher. However, lower fine fiber production volumes can be generated at lower voltage potential and/or more cells may be used such that voltage is usually not seen as critical.

Power supplies including both positive and negative power supplies may be used to generate the electrostatic field differential. Typically the collecting electrode is subject to a grounded potential while the spinning electrode is subject to a voltage generating power supply. However an opposite charged power supply can be connected to the collecting electrode as well such that voltage potential of either electrode relative to ground may not need to be quite so high. It is also possible to elevate both electrodes relative to ground with a same charge but differential there between. Therefore, it is most useful to evaluate a system from a voltage differential perspective between the collecting electrode and the discharge spinning electrode.

Fine fiber generation should generally occur over a sufficient distance to allow for evaporation and whipping of the fine fiber strands in Taylor cones from individual spinning locations. Preferably the filter media substrate is separated from the electrospinning electrode usually by at least 3 inches and usually not more than about 10 inches, typically between 4-7 inches. For example, for a nylon 6 polymeric solution, the target distance is preferably between about 5 and about 6 inches for good fine fiber generation with very small fiber diameters. Preferably, the filter media is run in contact with the collection electrode such that the target distance is effectively or generally the same for the collection electrode or the media (which is typically quite thin relative to target distance) relative to the spinning electrode.

This distance may be kept constant according to certain embodiments such as those shown in fine fiber generation equipment embodiments herein, wherein the target distance is maintained constant as each electrode segment translates over the media (e.g. it is preferably not systematically rotated closer and farther from the target). Additionally, target distance also involves the construction of the collection electrode. For example, as illustrated in FIGS. 1 and 7, a collection electrode can be a substantially solid perforated plate with a large surface area with many small orifices therein to facilitate suction and removal of evaporated solvent. The large surface area is helpful to maintain target distance (e.g. it avoids large jumps between surface portions on the collection electrode).

(c) Polymer Selection

Filtration applications often involve moisture and heat (and/or cold environments). For example, air filter applications for combustion engines of vehicles may not only operate hot or cold environments, but are also subject to heat generated by the engine and other conditions such as high humidity, dew, rain, snow or sleet such that moisture can be readily drawn into the filter along with the air stream. Liquid filter elements also must have compatibility and not dissolve in the liquid being filtered. Also, economic commercial mass production of filter media with consistent quality is also a consideration.

Preferred embodiments of the present invention for many filtration applications include polymers that naturally do not dissolve in water or when subject to moisture and are resistant to substantial temperature swings, including temperatures of up to 100° C. or more. Under such environmental conditions for extended periods as would be experienced in such filtrations applications, fine fibers made up of such polymers should retain all or at least a substantial portion of their filtration characteristics.

For example, certain embodiments of the present invention include nylon material which satisfies these qualities, including but not limited to Nylon 6 and Nylon 6,6. For example nylon 6 material has also been spun into fine fibers including a significant amount of fine fibers under 100 nanometers according to embodiments and examples set forth herein. However, other polymeric materials are also contemplated as set forth above.

(d) Solvent Selection & Polymeric Solution Management

Generally, a higher portion of solvent relative to polymer is desired on the one hand, but not so high as to prevent or inhibit fine fiber spinneret formation. Too high of a solution proportion can cause sputtering of polymer solvent rather than thread formation. However, the greater the solvent proportion, generally a thinner polymer fine fiber product is experienced. With a higher solvent content, more of the thread spinneret evaporates as it is being electrospun from the spinning electrode to the substrate material. As such, one factor to be controlled is solvent proportion.

Solvent selection is also a factor and dependent in part upon the polymer selected. While a single solvent may be used, preferably a combination of solvents are employed for conductivity and surface tension control to include at least on polymer dissolving agent that is suitable for dissolving the polymer(s) of choice and a conductivity control agent that adjusts the conductivity and surface tension of the polymeric solution to control fiber formation and generate finer fibers according to one embodiment. The conductivity and surface tension control agent may include salts, acids and other agents that affect conductivity. In accordance with one embodiment, the conductivity control agent includes a conductivity and surface tension reduction agent (an agent that lowers surface tension and lowers conductivity). A lower surface tension and conductivity has been found to be usable for significantly thinner fiber formation according to embodiments herein. Specifically, a higher conductivity and/or surface tension is believed to cause the fine fiber threads to jump more quickly from the spinning electrode toward the collection media and electrode. As a result, less time theoretically may be spent whipping in an electrospinning Taylor cone state, which reduces mechanical action for fiber size draw down.

For polyamides such as a nylon 6 embodiment and example, a suitable solvent includes formic acid as a dissolving agent and acetic acid primarily as a conductivity control and a surface tension agent. While acetic acid is listed as a potential polyamide solvent, this is really not correct as it will not break down nylon at room temperature, but instead heat is required and nylon will tend to precipitate back out of solution if employed. As such, a combination of solvents is an significant aspect according to some of the embodiments of the invention. In this example, usually more acetic acid relative to formic acid is desirable (e.g. greater than 50% acetic acid and less than 50% formic acid). For example, a solvent having about ⅔ acetic acid and about ⅓ formic acid has been found to create desirably thin fine fibers under 100 nanometers with excellent fiber generation (this example is at concentration levels of: 88% formic acid, that is e.g. 88% formic acid and 12% water; and 99.9% acetic acid, also known as glacial acetic acid). In particular, a sizeable reduction in fine fiber size was shown for nylon 6 when a move was made from pure formic acid solvent to a combination of acetic and formic acid. A solution of 8-20% of polymer relative to solvent (that is 92%-80% solvent) is an example of useable range for good fiber formation. More preferably a solution of about a 12% polymer solution generates good fiber formation and desirably thin fibers.

(e) Controlled Environment

Yet another factor involved is relative humidity and temperature. While other temperatures may be used, preferably, the temperature correlates to typical factory temperature ranges for industrial production reasons and worker comfort reasons. For example, example temperatures can be between 60° F. and 80° F., with 72° F. being typical as room temperature.

Of more importance is relative humidity as this factor affects evaporation and the flash off rate of solvent. If the humidity is too high, then not enough solvent evaporates resulting in thicker fibers. Alternatively, if the humidity is too low, then the solvent evaporates too quickly. If the solvent evaporates too quickly, the fibers are not allowed to thin sufficiently which is believed due to mechanical force through whipping action, which undesirably results in thicker fibers (e.g. the polymer fibers precipitate too rapidly to afford fiber draw down through mechanical whipping action). As such, environmental control of humidity is important. A relative humidity of between about 40% and about 55% is a usable range for example. In relation to a nylon 6 embodiment, a relative humidity of around 44% (e.g. preferably between 42-46%) results in good and very thin fiber formation.

(f) Substrate Adhesion

Additionally, for filtration applications, adhesion of the fibers to the filter media substrate is desirable. As a result, and in the case of common cellulose based substrates, depositing the fine fibers on the filter media substrate with some solvent remaining for evaporation is desirable to effectuate solvent type bonding and/or better integration of the fine fiber layer with the substrate. Adhesion should be sufficient to prevent fiber layer release simply through running a finger over media and/or due to normal abrasion or handling of the media. Adhesion is preferably at least sufficient to prevent a manually applied peeling force in accordance with the disclosure and teachings of US Patent Publication No. 2007/0163217 entitled "Cellulosic/Polyamid Composite" to Frey et al., the entire disclosure of which is hereby incorporated by reference.

While there are proposals for utilizing a separate fine fiber bonding/retention systems (e.g. U.S. Pat. No. 4,650,506 to Barris et al), preferably, solvent-type bonding between fine fibers and the filter media substrate is provided, whereby sufficient solvent remaining on the newly formed fibers comes in contact with the filter media substrate when deposited thereon. In relation to nylon examples with formic acid, excellent solvent bonding can occur for example with cellulose based media substrate as per the '217 patent publication. However, adhesives, cover layers and trapping techniques (e.g. between layers) may also be employed.

Test Methodologies

Before turning to examples below, some attention will be given to test methodologies that can be useful for evaluating fine fiber and filter media parameters Efficiencies as set forth herein that can be measured using fractional efficiency test methodology generally according to standard ASHRAE 52.2 and more particularly to the methodology and equipment explained below.

Figure 17:
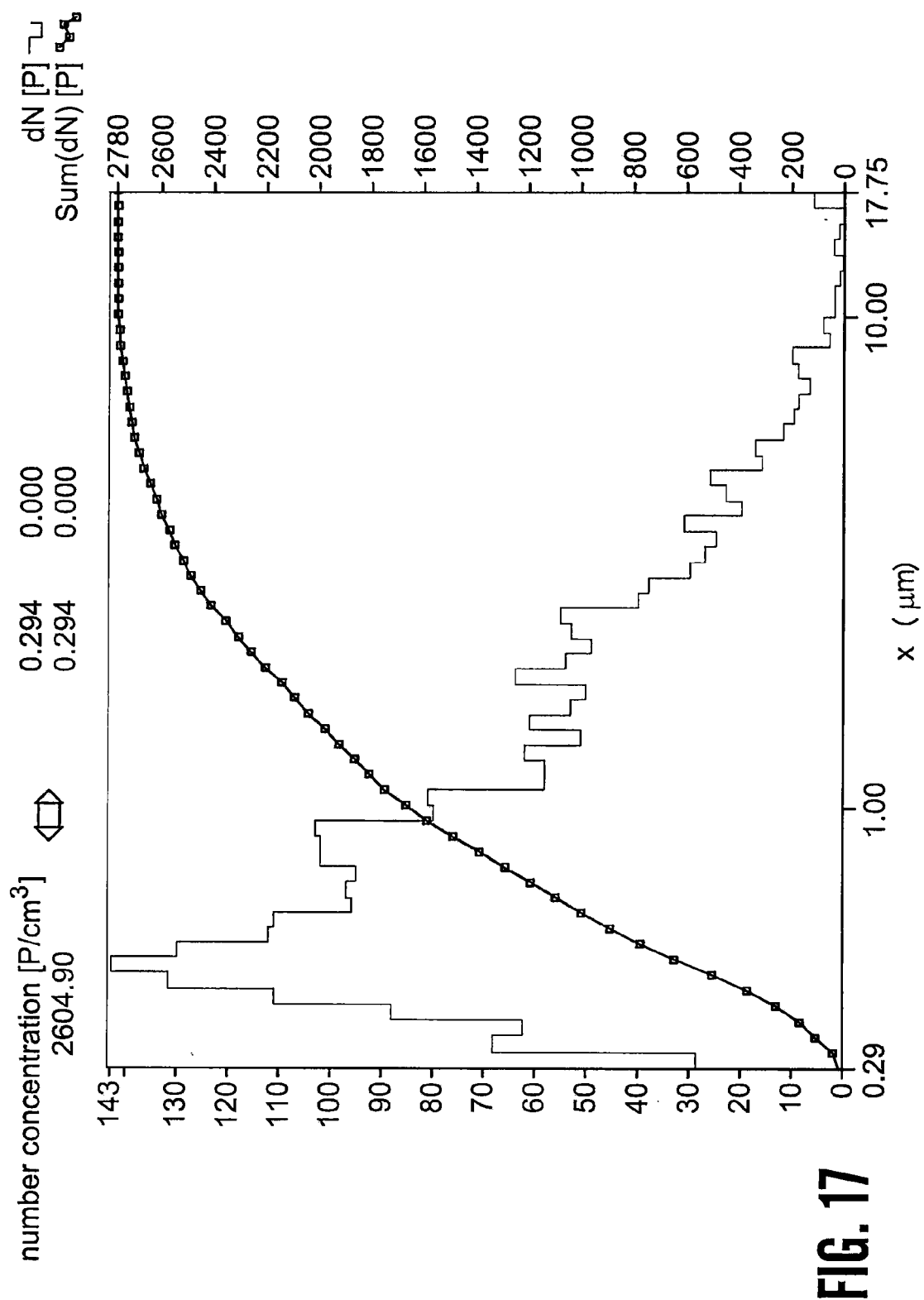
FIG. 17 is a graphical illustration showing the concentration of dust particles of ISO Fine test dust used for a fractional efficiency testing herein.

For the testing results set forth herein, fractional efficiency methodology utilized "ISO Fine" test powder, which is available from Powder Technology, Inc. of Burnsville, Minn. (Part No. ISO1212103-1). This powder includes graduated particle sizes such that a single test run can measure the particle capture efficiencies for different particle sizes. For example, particle size concentration and distribution is shown in the graph of FIG. 17. Filter media test samples (a circular disc of media of 100 square centimeters as is conventionally used in the below machine) were subjected to the ISO FINE powder in a PALAS MFP2000 (available from Palas® GMBH, Karlsruhe, Germany), at 120 l/m at a dust concentration of 70 mg/m$^3$. The PALAS MFP2000 had with a corona discharge unit (CD 2000) for neutralizing any charges on the dust to prevent false readings on electrostatic charge. Pressure drop readings are contemporaneously provided by this test equipment via pressure transducers built into the equipment that provide the pressure drop information at the same time, that is under the same operating parameters, such that pressure drop measurements and comparisons can be based on the same common flow rate parameter.

Pore size distribution data can be measured using a pore size distribution test according to standard ASTM-F316. For tests conducted herein, pore size distribution was conducted by the following methodology and equipment: a PMI (Porous Materials, Inc. of Ithaca, N.Y.) brand Capillary Flow Porometer—model no. CFP-1100AX-U-08182005-1446.

Figure 18:
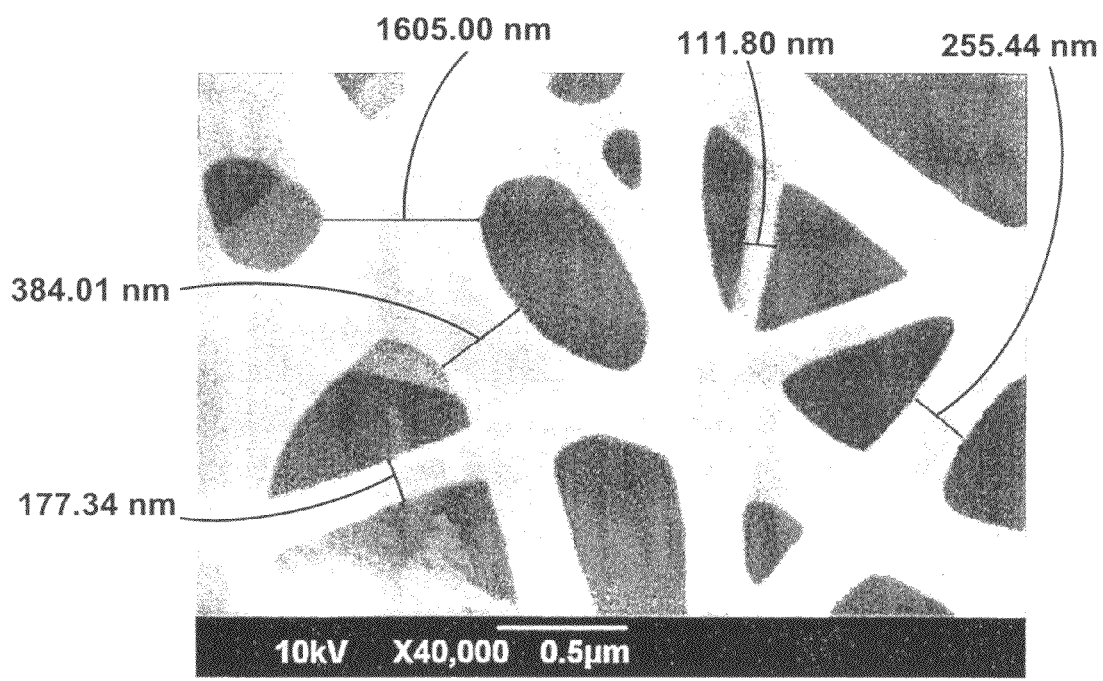
FIG. 18 is a scanning electron microscopic image taken at a magnification level of 40,000× of the fine fiber layer of the known filter media example of the Donaldson Company (e.g. the media for which test results are shown for FIGS. 11 and 13), with measurement observations being indicated on the image, for purpose of comparison with the invention.
Figure 19:
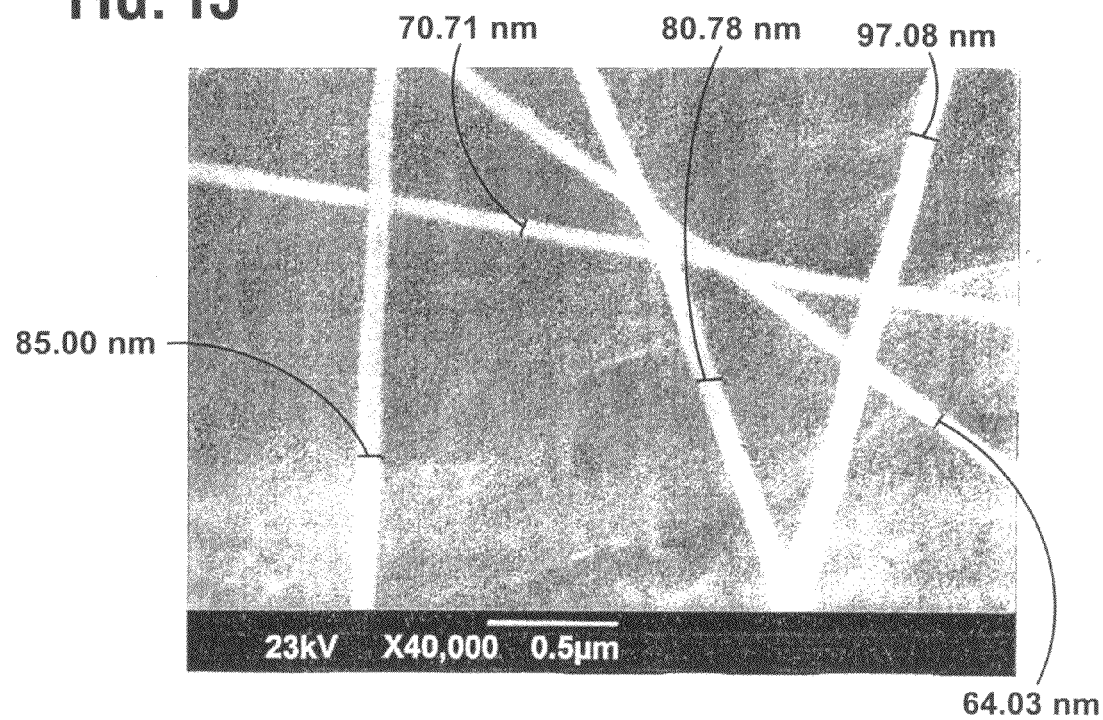
FIG. 19 is a scanning electron microscope image taken at 40,000× magnification of a fine fiber layer example produced in accordance with an embodiment of the present invention (e.g. with test results shown in FIGS. 15 and 16), with measurement observations being indicated on the image.

Fine fiber "diameter" in the context of the present disclosure and claims means and refers the width or thickness of fibers as observed and/or measured by a scanning electron microscope (SEM) measurement of individual fiber portions as was done and as can be seen graphically in FIGS. 18-19. Generally, measurements are typically taken at an intermediate region of the fiber portion that extends between transverse fibers or fiber portions (see e.g. SEM image figures—FIGS. 18-19). Measurements are generally not taken in areas where fibers strands may run together, meet or overlap. The "diameter" in this context and the claims does not mean nor does it require that the fibers are perfectly round, although some or all fibers may be circular. Considering the small size of the fibers and technology constraints, it is currently unknown what the true cross sectional shape is of fine fibers. It is assumed that the fibers are have a generally circular cross section.

Test and/or Production Examples

In the test examples below, the first two examples are control samples of a commercially available filter media product obtain prior to the filing date that is available from Donaldson Company, Inc., Minneapolis, Minn. Such control samples are for comparative purposes. It is believed that the media may be made in accordance with methodology set forth in one or more patent applications in the field of fine fibers that are assigned to Donaldson such as U.S. Pat. No. 6,743,273 to Chung et al. (or similar related patent in same family). Based on apparent solubility tendency in water and/or isopropyl alcohol, the fine fibers appear or are believed to be a derivative of poly vinyl alcohol.

Example 3 is an example of commercially available filter media substrate used for Examples 4 and 5. Example 4 was made in accordance with a beaded endless chain embodiment as described above in relation to FIGS. 1-8, whereas example 5 relates to observations of an embodiment of a filter media composite made with an El-Marco NANOSPIDER model NS-8A 1450 machine, available from El-Marco, s.r.o., Liberec, Czech-Republic.

EXAMPLE 1

Tests were performed on of a commercially available filter media composite product Donaldson Company, Inc., Minneapolis, Minn. Considering the media was contained in a cartridge, filter media samples were carefully removed from a cartridge for testing. Observations showed that the filter media composite included a coarser filter media substrate material and a layer of fine fibers deposited thereon. As shown in the scanning electron-microscope image of FIG. 18, fiber diameter of the fine fibers in the fine fiber layer was observed to typically greater than 100 nanometers and there was not a significant amount of fine fibers with diameters of less than 100 nanometers.

The composite media included a basis weight of 71.03 lb/3000 ft$^2$; a Frazier Permeability of 13.5 (CFM @ 0.5" WG); and a caliper thickness of 0.3 mil. Testing results indicated that the filter media could qualify as MERV 14 (based on fractional efficiency data), with an initial pressure drop of 362.87 Pa.

Figure 11:
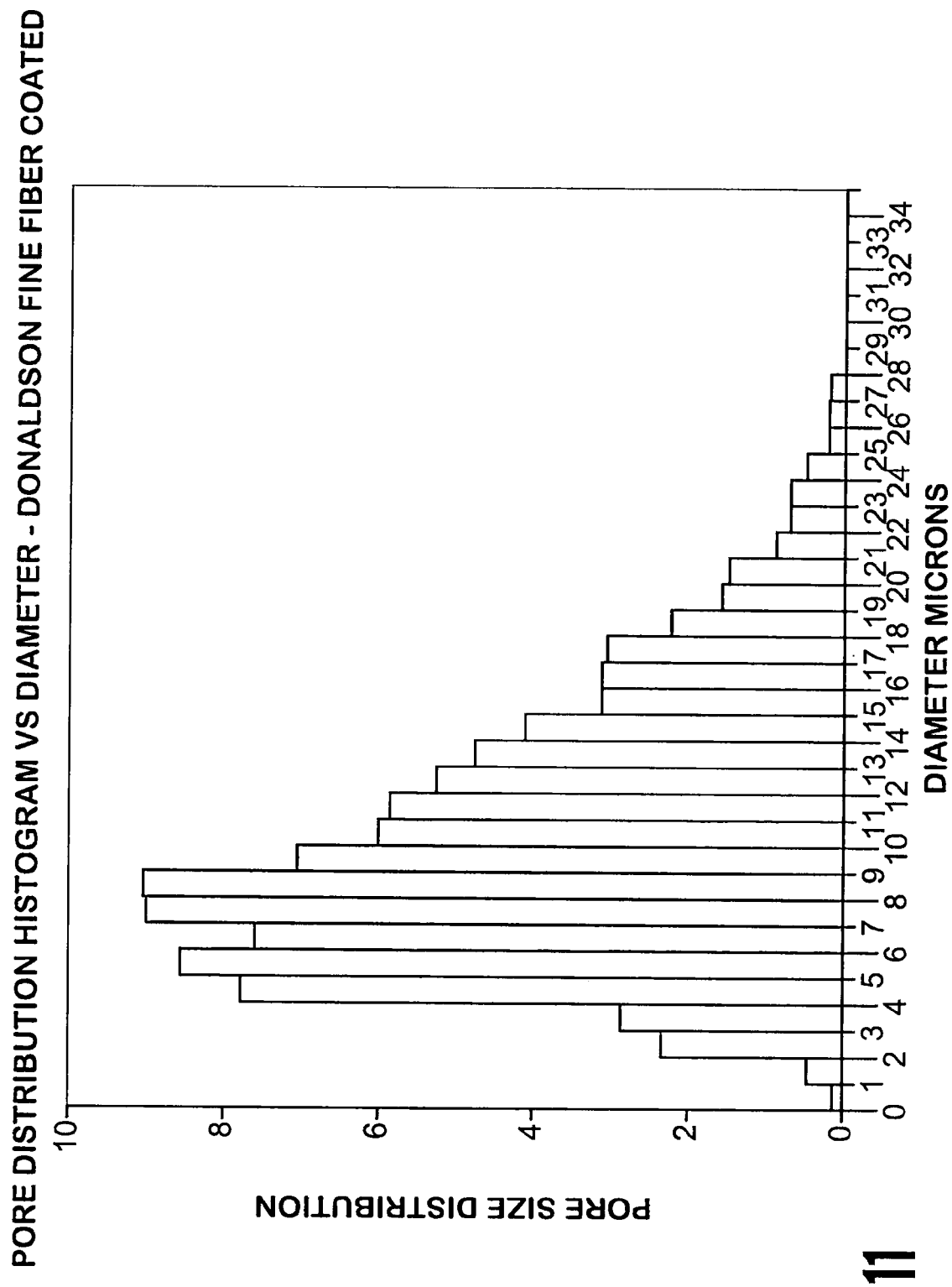
FIG. 11 is a pore size distribution histogram for a known prior example of a filter media including a fine fiber and substrate filter media composite according to a commercially available product from Donaldson Company, Inc.
Figure 13:
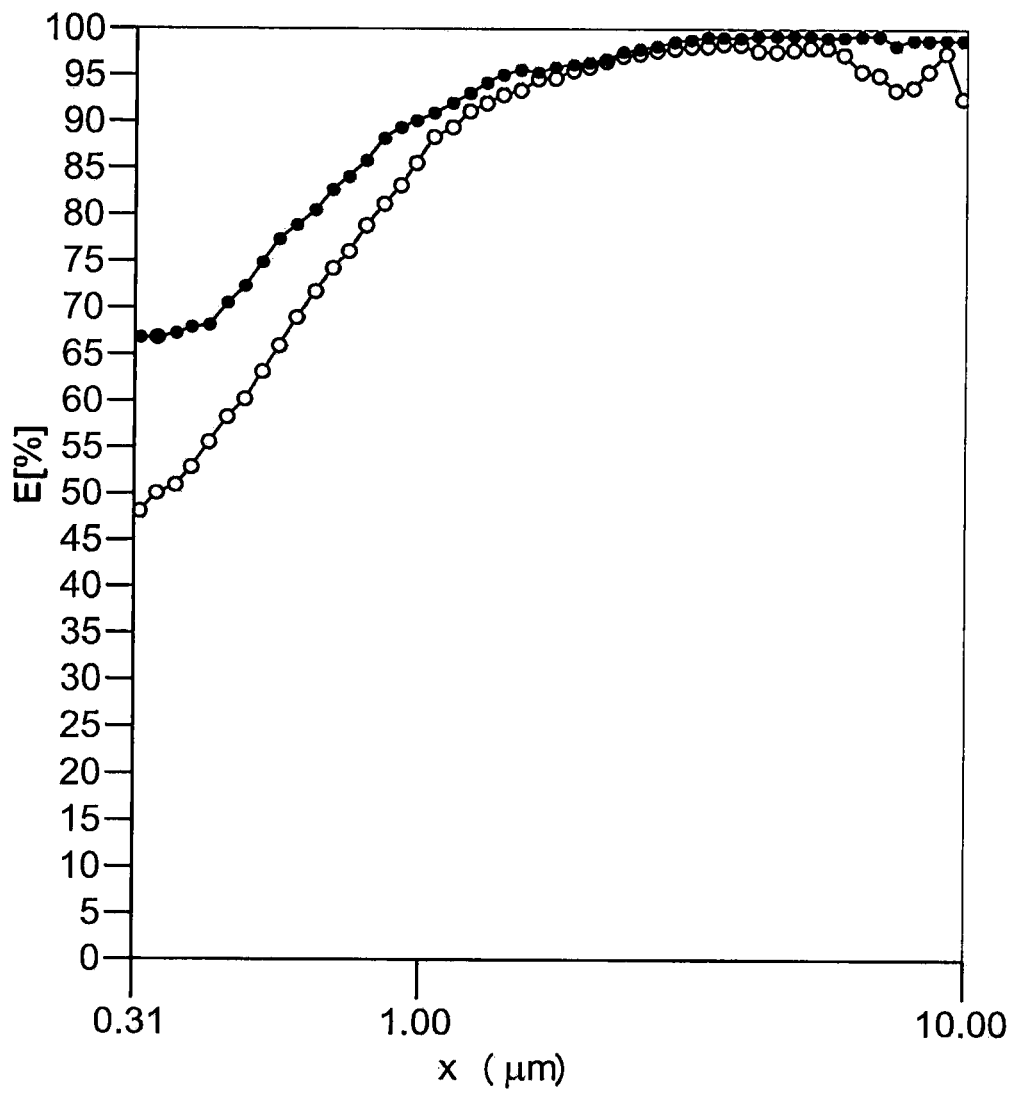
FIG. 13 is a fractional efficiency graph data that provides a comparison between the uncoated and coated medias for FIGS. 11 and 12 (the more efficient media being having a fine fiber layer)

Pore size and fractional efficiency test data for Example 1 were as follows and/or are shown in FIGS. 11 and 13.

TABLE 2

Pore size (μm)

| | Test Number | | | | |
|---|---|---|---|---|---|
| | 1 | 2 | 3 | Mean | SD |
| Max | 26.3 | 34.9 | 27.6 | 29.587 | 4.62 |
| Mean | 9.1 | 9.2 | 8.9 | 9.08 | 0.17 |
| Smallest | 2.58 | 2.32 | 2.22 | 2.3733 | 0.19 |

TABLE 3

Cumulative Filter Flow, Pore size (μm)

| | Test Number | | | |
|---|---|---|---|---|
| | 1 | 2 | 3 | Mean |
| 10% of Flow | 15.89 | 17.8 | 16.7 | 16.8 |
| 25% of Flow | 12.06 | 13.5 | 12.7 | 12.8 |
| 75% of Flow | 6.38 | 6.4 | 6.3 | 6.3 |
| 90% of Flow | 4.53 | 4.7 | 4.6 | 4.6 |

TABLE 4

Fractional Efficiency Results

| Range (, μm) | E (%) | OTHER DATA |
|---|---|---|
| 0.237-0.316 | 66.66 | |
| 0.316-0.422 | 67.51 | |
| 0.422-0.562 | 73.80 | Dust Concentration |
| 0.562-0.750 | 80.70 | 70 mg/m$^3$ |
| 0.750-1.000 | 88.43 | |
| 1.000-1.334 | 92.66 | Flow Rate |
| 1.334-1.778 | 95.65 | 120 L/min |
| 1.778-2.371 | 96.87 | |
| 2.371-3.162 | 98.61 | Test Dust |
| 3.162-4.217 | 99.49 | ISO Fine |
| 4.217-5.623 | 99.51 | |
| 5.623-7.499 | 99.23 | Initial Pressure Drop |
| 7.499-10.000 | 99.00 | 362.87 Pa |

EXAMPLE 2

Tests were performed on the substrate filter media of example 1 for purposes of attempting to better evaluate the filtration characteristics of the fine fiber layer. Specifically, samples of the commercially available filter media composite product Donaldson Company, Inc., Minneapolis, Minn. were first soaked in isopropyl alcohol to dissolve and thereby remove the fine fiber layer. The fine fibers appeared to completely dissolve in isopropyl alcohol, which is why isopropyl alcohol was chosen as the solvent. The samples were then allowed to dry to evaporate the isopropyl solvent and then the samples were tested.

The substrate media included a basis weight of 71.27 lb/3000 ft$^2$; a Frazier Permeability of 15.3 (CFM @ 0.5" WG); and a caliper thickness of 0.3 mil. Testing results indicated that the filter media could qualify as MERV 13 (based on fractional efficiency data), with an initial pressure drop of 378.13 Pa.

Figure 12:
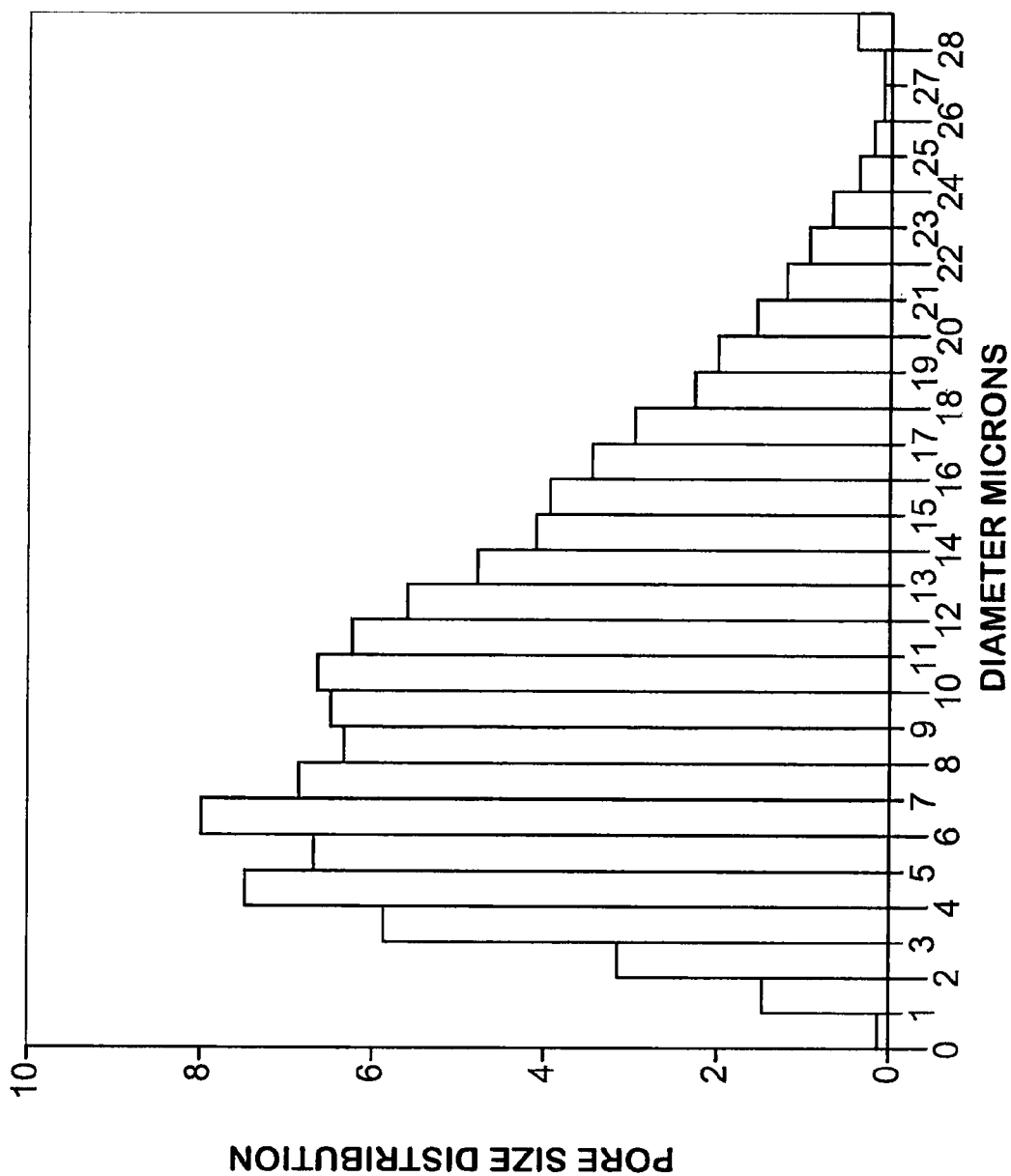
FIG. 12 is a pore size distribution histogram for the filter media substrate of the media used for FIG. 11 (in that the fine fiber layer has been removed by soaking a sample in isopropyl alcohol according International Standard EN-779) so as to illustrate the effects the fine fiber coating of the known prior example.

Pore size and fractional efficiency test data for Example 2 were as follows and/or are shown in FIGS. 12 and 13

TABLE 5

Pore size (μm)

| | Test Number | | | | |
|---|---|---|---|---|---|
| | 1 | 2 | 3 | Mean | SD |
| Max | 27.4 | 28.4 | 28.8 | 28.183 | 0.73 |
| Mean | 9.0 | 9.3 | 9.6 | 9.27 | 0.30 |
| Smallest | 2.73 | 2.23 | 1.90 | 2.2867 | 0.42 |

TABLE 6

Cumulative Filter Flow, Pore size (μm)

| | Test Number | | | |
|---|---|---|---|---|
| | 1 | 2 | 3 | Mean |
| 10% of Flow | 16.93 | 17.3 | 17.8 | 17.4 |
| 25% of Flow | 13.11 | 13.4 | 13.8 | 13.4 |
| 75% of Flow | 5.87 | 6.1 | 6.0 | 6.0 |
| 90% of Flow | 4.09 | 4.4 | 3.9 | 4.1 |

TABLE 7

Fractional Efficiency Results

| Range (, μm) | E (%) | OTHER DATA |
|---|---|---|
| 0.237-0.316 | 48.07 | |
| 0.316-0.422 | 52.36 | |
| 0.422-0.562 | 61.90 | Dust Concentration |
| 0.562-0.750 | 71.44 | 70 mg/m$^3$ |
| 0.750-1.000 | 82.20 | |
| 1.000-1.334 | 90.32 | Flow Rate |
| 1.334-1.778 | 93.96 | 120 L/min |
| 1.778-2.371 | 96.30 | |
| 2.371-3.162 | 97.83 | Test Dust |
| 3.162-4.217 | 98.21 | ISO Fine |
| 4.217-5.623 | 97.99 | |
| 5.623-7.499 | 96.02 | Initial Pressure Drop |
| 7.499-10.000 | 95.00 | 378.13 Pa |

EXAMPLE 3

Tests were performed on an uncoated, relatively low grade cellulose fiber material substrate filter media that was used as the substrate material for the fine fiber filter media composite of Example 4. The substrate filter media was purchased from Ahlstrom of under the brand/model designation AFI-23N-4. Thus, there was no need to prepare the sample through an isopropyl alcohol soak as was done for Example 2.

The substrate media included a basis weight of 59.8 lb/3000 ft$^2$; a Frazier Permeability of 23.4 (CFM @ 0.5" WG); and a caliper thickness of 0.4 mil. Testing results indicated that the filter media could qualify as MERV 12 (based on fractional efficiency data), with an initial pressure drop of 242.63 Pa.

Figure 14:
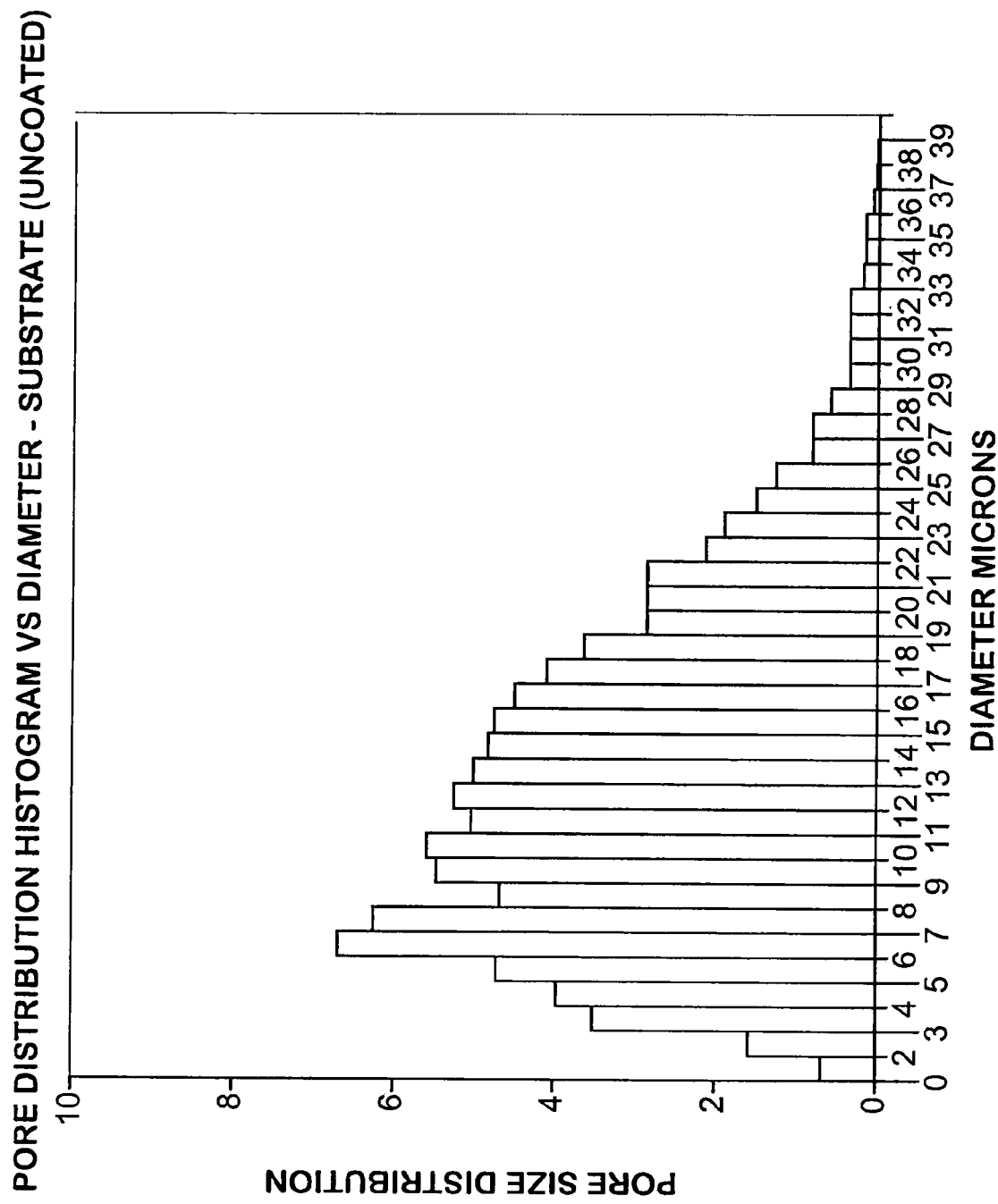
FIG. 14 is a pore size distribution histogram for a filter media substrate that is used as a substrate filter media in an example of an embodiment of the present invention (without a fine fiber layer added thereto)
Figure 16:
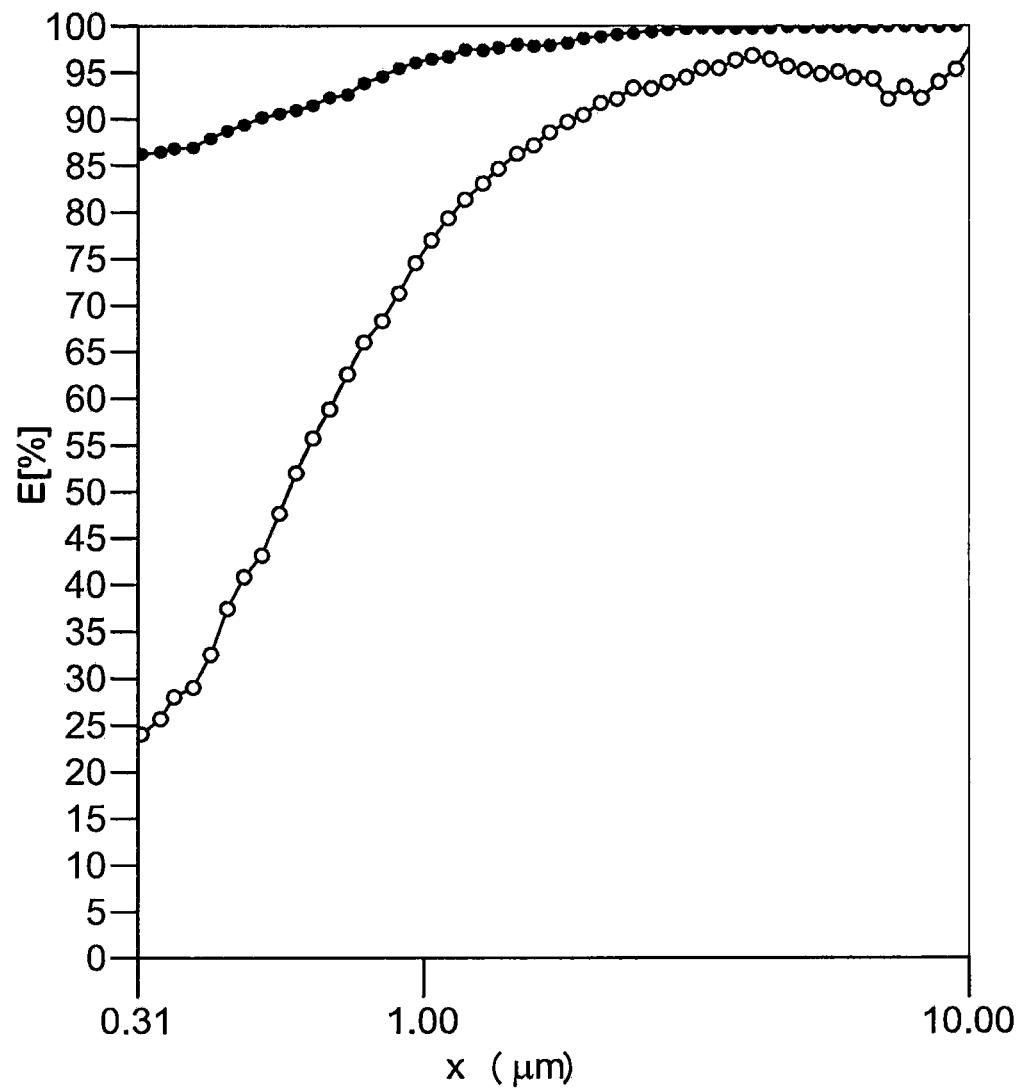
FIG. 16 is a fractional efficiency graph data that provides comparison between the uncoated and coated fine fiber coated medias used for FIGS. 14 and 15 (the more efficient media being having a fine fiber layer)

Pore size and fractional efficiency test data for Example 3 were as follows and/or are shown in FIGS. 14 and 16:

TABLE 8

Pore size (μm)

| | Test Number | | | | |
|---|---|---|---|---|---|
| | 1 | 2 | 3 | Mean | SD |
| Max | 40.6 | 39.2 | 42.6 | 40.81 | 1.68 |
| Mean | 12.0 | 12.2 | 12.0 | 12.073 | 0.13 |
| Smallest | 2.52 | 2.47 | 2.38 | 2.4567 | 0.07 |

TABLE 9

Cumulative Filter Flow, Pore size (μm)

| | Test Number | | | |
|---|---|---|---|---|
| | 1 | 2 | 3 | Mean |
| 10% of Flow | 22.35 | 22.3 | 22.0 | 22.2 |
| 25% of Flow | 17.37 | 17.4 | 17.2 | 17.3 |
| 75% of Flow | 7.73 | 7.5 | 7.7 | 7.6 |
| 90% of Flow | 5.34 | 4.9 | 4.9 | 5.0 |

TABLE 10

Fractional Efficiency Results

| Range (, μm) | E (%) | OTHER DATA |
|---|---|---|
| 0.237-0.316 | 30.34 | |
| 0.316-0.422 | 34.46 | |
| 0.422-0.562 | 42.77 | Dust Concentration |
| 0.562-0.750 | 54.52 | 70 mg/m$^3$ |
| 0.750-1.000 | 69.10 | |
| 1.000-1.334 | 78.90 | Flow Rate |
| 1.334-1.778 | 86.02 | 120 L/min |
| 1.778-2.371 | 90.61 | |
| 2.371-3.162 | 93.79 | Test Dust |
| 3.162-4.217 | 95.22 | ISO Fine |
| 4.217-5.623 | 95.32 | |
| 5.623-7.499 | 94.79 | Initial Pressure Drop |
| 7.499-10.000 | 93.45 | 242.63 Pa |

EXAMPLE 4

A filter media composite having a cellulose based substrate layer and a nylon 6 fine fiber layer was prepared using the substrate media of Example 3. The composite media was made with a endless metal beaded chain electrode (an embodiment that used one beaded chain cell) as described above in relation to FIGS. 1-8. Environmental conditions were room temperature (e.g. 72° F.) and a relative humidity of 44%. Fine fibers were made from a 12% nylon 6 solution, in which the nylon 6 was dissolved in a ⅔ glacial acetic acid and ⅓ formic acid solution (the formic acid used had an 88% concentration, while the acetic acid had a 99.9% concentration level).

A 95,000 voltage potential was provided. The metal beaded chain electrode was electrically coupled to a negative 45,000 voltage power source supply and the collection electrode was subjected to positive 50,000 voltage power supply. The target spacing was maintained between the metal beaded chain electrode and the collection electrode at 5½ inches, with the substrate media run over and in contact with the collection electrode.

As shown in the scanning electron-microscope image of FIG. 19, fiber diameter of the fine fibers in the fine fiber layer was observed to typically less than 100 nanometers with a significant amount of fine fibers with diameters of less than 100 nanometers. For multiple runs and/or observation locations, SEM observations indicated that typically between about 80%-90% of the fine fibers had diameters between 50 nanometers and 100 nanometers.

The composite media included a basis weight of 61.05 lb/3000 ft$^2$; a Frazier Permeability of 22.9 (CFM @ 0.5" WG); and a caliper thickness of 0.5 mil. Testing results indicated that the composite filter media could qualify as MERV 15 (based on fractional efficiency data), with an initial pressure drop of 243.63 Pa (e.g. a difference of less than 1% relative to uncoated media of Example 3).

Figure 15:
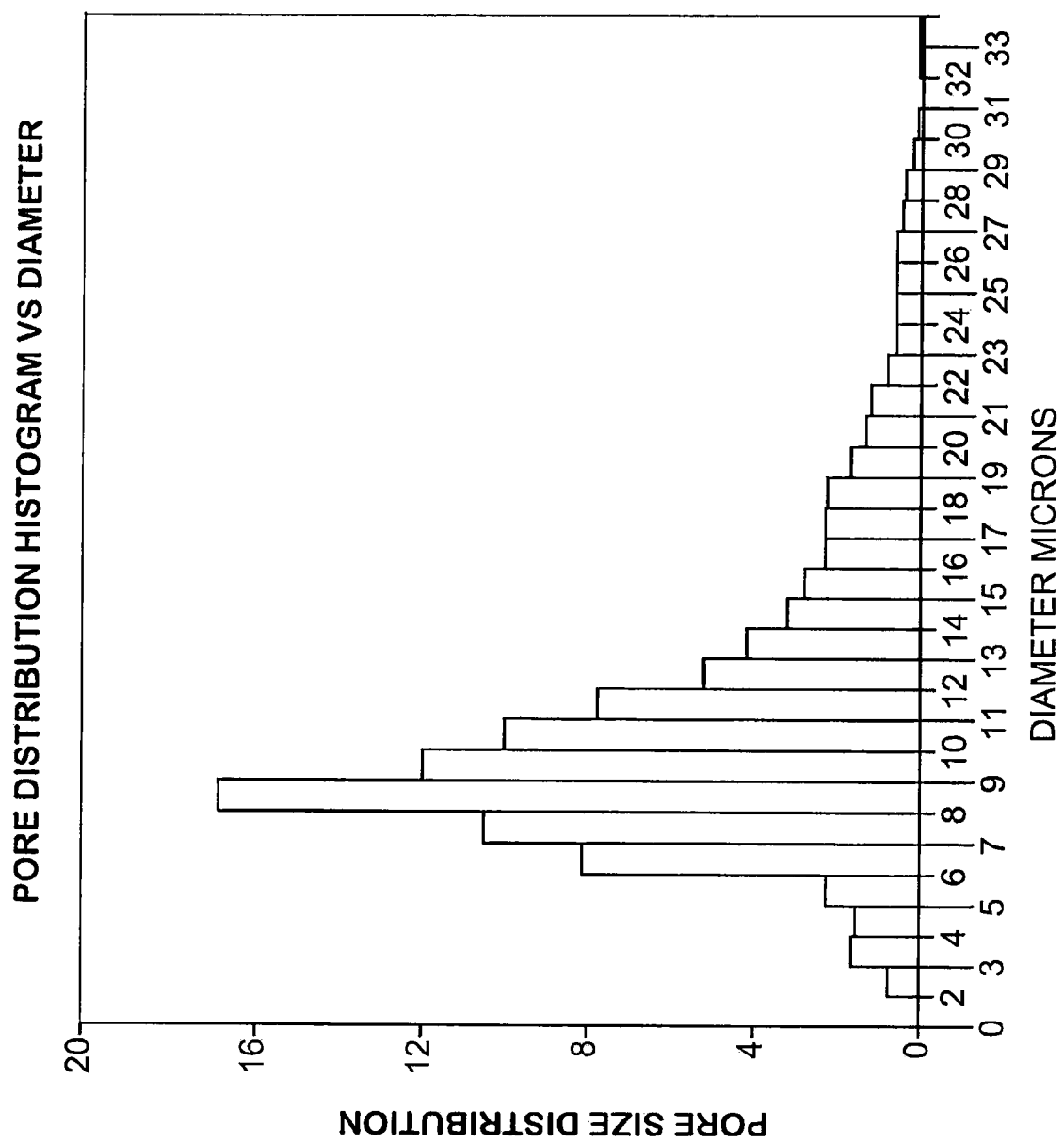
FIG. 15 is a pore size distribution histogram of a filter media composite comprising the filter media substrate (used in FIG. 14) with a fine fiber layer added in accordance with an example and embodiment of the present invention.

Pore size and fractional efficiency test data for Example 4 were as follows and/or are shown in FIGS. 15 and 16:

TABLE 11

Pore size (μm)

| | Test Number | | | | |
|---|---|---|---|---|---|
| | 1 | 2 | 3 | Mean | SD |
| Max | 33.8 | 37.0 | 32.7 | 34.497 | 2.20 |
| Mean | 9.7 | 10.4 | 9.4 | 9.8367 | 0.49 |
| Smallest | 3.38 | 2.74 | 2.55 | 2.89 | 0.43 |

TABLE 12

Cumulative Filter Flow, Pore size (μm)

| | Test Number | | | |
|---|---|---|---|---|
| | 1 | 2 | 3 | Mean |
| 10% of Flow | 17.88 | 19.2 | 17.0 | 18.0 |
| 25% of Flow | 12.81 | 14.3 | 12.4 | 13.2 |
| 75% of Flow | 8.02 | 7.2 | 7.1 | 7.4 |
| 90% of Flow | 6.66 | 4.8 | 4.7 | 5.4 |

TABLE 13

Fractional Efficiency Results
Fractional Efficiency Results

| Range (, μm) | E (%) | OTHER DATA |
|---|---|---|
| 0.237-0.316 | 87.71 | |
| 0.316-0.422 | 88.47 | |
| 0.422-0.562 | 89.79 | Dust Concentration |
| 0.562-0.750 | 92.10 | 70 mg/m$^3$ |
| 0.750-1.000 | 94.88 | |
| 1.000-1.334 | 96.88 | Flow Rate |
| 1.334-1.778 | 98.16 | 120 L/min |
| 1.778-2.371 | 98.97 | |
| 2.371-3.162 | 99.54 | Test Dust |
| 3.162-4.217 | 99.90 | ISO Fine |
| 4.217-5.623 | 100.00 | |
| 5.623-7.499 | 100.00 | Initial Pressure Drop |
| 7.499-10.000 | 100.00 | 243.85 Pa |

EXAMPLE 5

A filter media composite having a cellulose based substrate layer and a nylon 6 fine fiber layer was prepared using the substrate media of Example 3 according to parameters of Example 4, except that different equipment was utilized, namely, an El-Marco NANOSPIDER model NS-8A 1450 machine, available from El-Marco, s.r.o., Liberec, Czech-Republic, and that modifications were made to the machine by increasing the voltage supply to 95,000 volts to increase fine fiber production. Environmental conditions were room temperature (e.g. 72° F.) and a relative humidity of 44%. Fine fibers were made from a 12% nylon 6 solution, in which the nylon 6 was dissolved in a ⅔ acetic acid and ⅓ formic acid solution (the formic acid used had an 88% concentration, while the acetic acid had a 99.9% concentration level). An electrostatic field of a 95,000 voltage differential was provided. The target spacing between the spinning electrode and the collection electrode at 5½ inches (measured at the closest point). For multiple runs and/or observation locations, SEM observations indicated that typically between about 80%-90% of the fine fibers had diameters between 50 nanometers and 100 nanometers.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming filter media, comprising:
    dissolving a polymer in a solvent comprising acetic acid and formic acid to form a polymer solution, wherein the acetic acid is present in an amount greater than 50% and the formic acid is present in an amount less than 50%;
    electrospinning fine fibers from the polymer solvent from an electrode under an electrostatic field; and
    depositing the fine fibers onto a substrate layer;
    wherein the method is provided to generate a significant amount of the fine fibers with a diameter of less than 100 nanometers and greater than or equal to 50 nanometers.

2. The method of claim 1, wherein the formic acid is a dissolving agent for the polymer and the acetic acid adjusts at least one of conductivity and surface tension.

3. The method of forming filter media of claim 1, wherein the method includes:
    containing the polymer solution in a receptacle;
    dipping the electrode into the polymer solution and emitting fibers at several spinning locations from the electrode over a span;
    running the substrate transverse to the span to collect the emitted fibers.

4. The method of forming filter media of claim 3, further comprising solvent bonding the fine fibers to the substrate layer.

5. The method of claim 1, wherein spinning locations are in a generally linear array across the electrode along an edge of the electrode.

6. The method of claim 5, wherein the linear array includes a plurality of rows spinning locations.

7. The method of claim 3, wherein a plurality of electrodes are arranged with respective spans transverse to the running of the substrate, the electrodes spaced between inlet and outlet ends of a electrospinning region, the substrate running through the inlet end to the outlet end.

8. The method of claim 1, wherein the substrate layer is spaced between about 4 and about 10 inches from the electrode, and controlling the relative humidity between about 30% and 50%.

9. The method of claim 8 wherein the polymer comprises a nylon and wherein a solvent ratio of polymer to solvent is controlled between about 8% and about 20%.

10. The method of claim 1, wherein the solvent comprises about ⅔ acetic acid and about ⅓ formic acid.

* * * * *